(12) United States Patent
Tsuchiyama et al.

(10) Patent No.: US 7,936,536 B2
(45) Date of Patent: May 3, 2011

(54) MAGNETIC RECORDING MEDIUM HAVING LANDS WITH CURVED UPPER SURFACES AND MAGNETIC RECORDING AND REPRODUCING APPARATUS

(75) Inventors: Ryuji Tsuchiyama, Matsudo (JP); Masahumi Mochizuki, Chigasaki (JP); Kyosuke Ono, Hachioji (JP); Yuko Tsuchiya, Tokorozawa (JP); Hiroshi Ikekame, Fuchu (JP)

(73) Assignee: Hitachi, Ltd., Tokyo (JP)

( * ) Notice: Subject to any disclaimer, the term of this patent is extended or adjusted under 35 U.S.C. 154(b) by 868 days.

(21) Appl. No.: 11/780,521

(22) Filed: Jul. 20, 2007

(65) Prior Publication Data

US 2008/0049359 A1 Feb. 28, 2008

(30) Foreign Application Priority Data

Aug. 25, 2006 (JP) ................................. 2006-229709

(51) Int. Cl.
*G11B 5/68* (2006.01)
*G11B 5/82* (2006.01)
(52) U.S. Cl. .................... 360/135; 428/842; 427/128
(58) Field of Classification Search .................. 360/135; 427/127, 128; 428/842
See application file for complete search history.

(56) References Cited

U.S. PATENT DOCUMENTS

| 7,494,727 | B2 * | 2/2009 | Suwa et al. ................. 428/832.2 |
| 7,616,404 | B2 * | 11/2009 | Suwa et al. .................... 360/135 |
| 2003/0179477 | A1 * | 9/2003 | Usa et al. ........................ 360/17 |
| 2005/0069732 | A1 | 3/2005 | Kamata et al. |
| 2005/0233176 | A1 | 10/2005 | Takai et al. |
| 2006/0257694 | A1 | 11/2006 | Hieda et al. |
| 2008/0297947 | A1 * | 12/2008 | Okura et al. .................. 360/135 |

FOREIGN PATENT DOCUMENTS

| JP | 2005-052956 | 3/2005 |
| JP | 2005-108335 | 4/2005 |
| JP | 2005-276325 | 10/2005 |
| JP | 2006-318607 | 11/2006 |
| JP | 2008-010036 | 1/2008 |
| WO | WO 2007/074645 | 7/2007 |

* cited by examiner

*Primary Examiner* — Jefferson Evans
(74) *Attorney, Agent, or Firm* — Antonelli, Terry, Stout & Kraus, LLP.

(57) ABSTRACT

In a discrete track medium and a patterned medium, a meniscus adsorptive force is reduced and writing into adjacent tracks is prevented. A magnetic layer in lands or patterns in the discrete track medium or the patterned medium is formed into a cylindrical shelly or spherical shelly shape with a uniform thickness. Moreover, a height of cylindrical shelly land or a height of spherical shelly land is changed between 5 nm and 30 nm according to radial positions. Thus, an effect is achieved for providing a magnetic recording medium and a magnetic disk apparatus which are excellent in realizing higher recording density and higher reliability.

12 Claims, 22 Drawing Sheets

MAGNETIC RECORDING MEDIUM HAVING LANDS WITH CURVED UPPER SURFACES AND MAGNETIC RECORDING AND REPRODUCING APPARATUS

CLAIM OF PRIORITY

The present application claims priority from Japanese application JP 2006-229709 filed on Aug. 25, 2006, the content of which is hereby incorporated by reference into this application.

BACKGROUND OF THE INVENTION

1. Field of the Invention

The present invention relates to a magnetic recording medium and a magnetic recording and reproducing apparatus, and more particularly relates to a magnetic recording and reproducing apparatus excellent in achieving higher recording density and higher reliability.

2. Description of the Related Art

A magnetic disk apparatus used as an external storage unit for a large-sized computer or a personal computer system has been demanded to increase a recording capacity (areal density) per disk. In order to achieve a higher recording density, it will be required in the future to reduce a magnetic spacing from a reader and writer in a magnetic head to a magnetic layer and to improve recording and reproduction performance, positioning accuracy, and reproduction signal processing performance with respect to the magnetic head and a magnetic recording medium. Particularly, since magnetic field strength is in inverse proportion to the magnetic spacing squared, the areal density is significantly increased when the magnetic spacing is reduced. The magnetic spacing is expressed as a sum of a flying height at a position of the reader and writer in the magnetic head stably flying above a surface of the magnetic recording medium on the basis of principles of air film lubrication, a dent caused by a difference in a processing amount of a magneto-resistive sensor exposed part in a magneto-resistance effect type magnetic head, a slider overcoat thickness, a medium lubrication film thickness and a medium overcoat thickness. The magnetic spacing is reduced by reducing values of those described above. When the flying height at the position of the reader and writer in the magnetic head is reduced to several nm, the following problems occur. Specifically, the slider is likely to intermittently come into contact with rough protrusions on a disk surface. Moreover, when the protrusions are reduced in size to smooth the disk surface, contact vibration is caused by a meniscus adsorptive force of the lubrication film.

In recent years, a discrete track magnetic recording system and a bit patterned magnetic recording system have been proposed as innovative technologies to respond to the higher recording density of the magnetic disk apparatus. These are technologies that allow higher track density and higher recording density by forming grooves between recording tracks in a magnetic recording medium or by isolating bits to reduce magnetic interference between the adjacent tracks or the bits. In a magnetic recording medium described in Japanese Patent Application Laid-Open Publication No. 2005-108335, a film surface on a cross-section passing a center of a ferromagnetic dot of a carbon film that is a medium overcoat has a smooth shape which is gradually reduced toward outside from the center. Specifically, a thickness of the carbon film is not uniform and there is film thickness distribution. Moreover, a thickness of a center portion passing the center of the ferromagnetic dot is 5 nm, and the thickness of the carbon film at a position of 1/10 of a radius of the ferromagnetic dot from an end portion is 3.5 μm. The carbon film having such a cross-sectional shape is formed by performing etching in which an ion incident angle is gradually changed from a substrate perpendicular direction to a longitudinal direction. In an information recording medium described in Japanese Patent Application Laid-Open Publication No. 2005-276325, a non-magnetic material is buried in respective concave portions of a magnetic layer formed into a predetermined concave-convex pattern, and a non-magnetic layer is formed on respective convex portions of the magnetic layer. Moreover, an upper center of each of the convex portions of the magnetic layer is formed into an angular shape gradually protruding upward. A protrusion amount thereof is 1 nm. Such a shape is formed by setting a long ion beam etching time for the non-magnetic layer. A nanostructure described in Japanese Patent Application Laid-Open Publication No. 2005-52956 includes a first columnar member and a second member formed so as to surround the first member. The second member contains two kinds or more of materials that can form eutectic crystal. Moreover, one of the materials is a semiconductor material, a height of the first member from a substrate is higher than that of the second member from the substrate, and a protrusion of the first member has a conical shape.

SUMMARY OF THE INVENTION

In the conventional magnetic recording medium, as a factor that inhibits reduction in the flying height, slider vibration is caused by increases in a meniscus adsorptive force of a lubricant and a frictional force at the time of contact with a smooth medium surface, a discrete track medium and a patterned medium. Moreover, in innermost and outermost regions where the absolute value of a yaw angle is increased, magnetic fluxes are more easily leaked since the writer comes closer to the adjacent track as compared with a middle region where the yaw angle is 0°. Moreover, in a conventional discrete track medium, when a cylindrical land shape and a flying height hf at a position of a reader and writer are set the same, the cylindrical land shape is formed by distributing a carbon film that is a medium overcoat. Thus, a magnetic spacing is increased. As a result, areal density cannot be increased.

It is an object of the present invention to provide a magnetic recording medium which satisfies higher recording density and reduction in a flying height at the same time by reducing a meniscus adsorptive force as a factor that inhibits reduction in the flying height and by preventing writing into adjacent tracks also in innermost and outermost regions where the absolute value of a yaw angle is increased. Moreover, it is also the object of the present invention to provide a magnetic disk apparatus including the magnetic recording medium.

The above object is achieved by forming a magnetic layer in lands or patterns in a discrete track medium or a patterned medium into a cylindrical shelly or spherical shelly shape with a uniform thickness and by changing a height of cylindrical shelly land or a height of spherical shelly land between 5 nm and 30 nm according to radial positions of a disk.

According to the present invention, it is possible to realize the magnetic recording medium which satisfies higher recording density and reduction in the flying height at the same time and the magnetic disk apparatus including the magnetic recording medium.

DETAILED DESCRIPTION OF THE PREFERRED EMBODIMENTS

With reference to the drawings, embodiments of the present invention will be described below.

Figure 1:
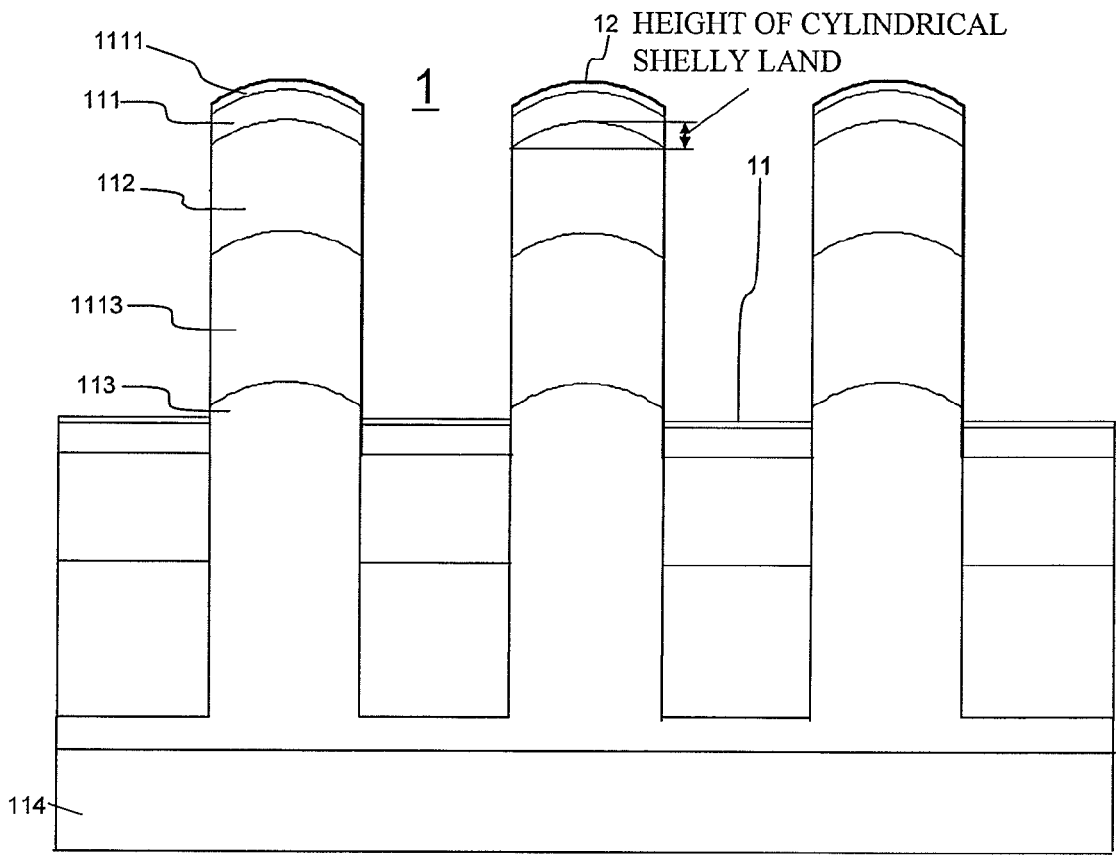
FIG. 1 is a schematic cross-sectional view of a magnetic recording medium according to Embodiment 1 of the present invention.
Figure 2:
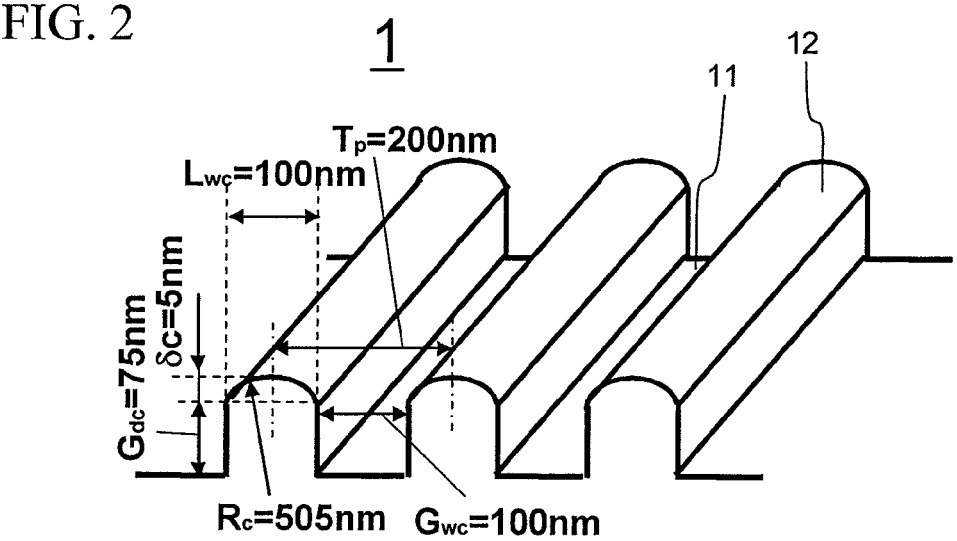
FIG. 2 is a schematic perspective view of the magnetic recording medium according to Embodiment 1 of the present invention.

FIG. 1 is a schematic cross-sectional view of a magnetic recording medium according to Embodiment 1 of the present invention, and FIG. 2 is a schematic perspective view thereof. A magnetic recording medium 1 of this embodiment is a discrete track medium which has grooves 11 and lands 12 and has tracks formed by the lands 12. Each of the lands 12 has an overcoat 111, a magnetic layer 112, an underlayer 113 such as $SiO_2$, an underlayer 1113 such as a soft magnetic underlayer, and a non-magnetic substrate 114. A lubricant 1111 is applied onto a surface of the overcoat 111. The magnetic layer 112 is formed to have a curved shape of which height is higher in its center portion than in its end portion in a state where a film thickness thereof is fixed. As shown in FIG. 1, a length between the center portion of the magnetic layer 112 and the end portions thereof in a track width direction is defined as a height of cylindrical shelly land. FIG. 2 shows a dimensional example. A width Gwc of the groove 11 is 100 nm, a depth Gdc of the groove is 75 nm, a width Lwc of the land 12 is 100 nm, and a track width Tp that is a distance between adjacent lands is about 200 nm. The height δc of cylindrical shelly land of the land 12 is about 5 nm, and a curvature Rc of cylindrical shelly land is about 505 nm. The curvature Rc of cylindrical shelly land is expressed as follows by use of the land width Lwc and the height of cylindrical shelly land.

$$Rc=((Lwc/2)^2+\delta c^2)/(2\delta c)$$

Figure 3:
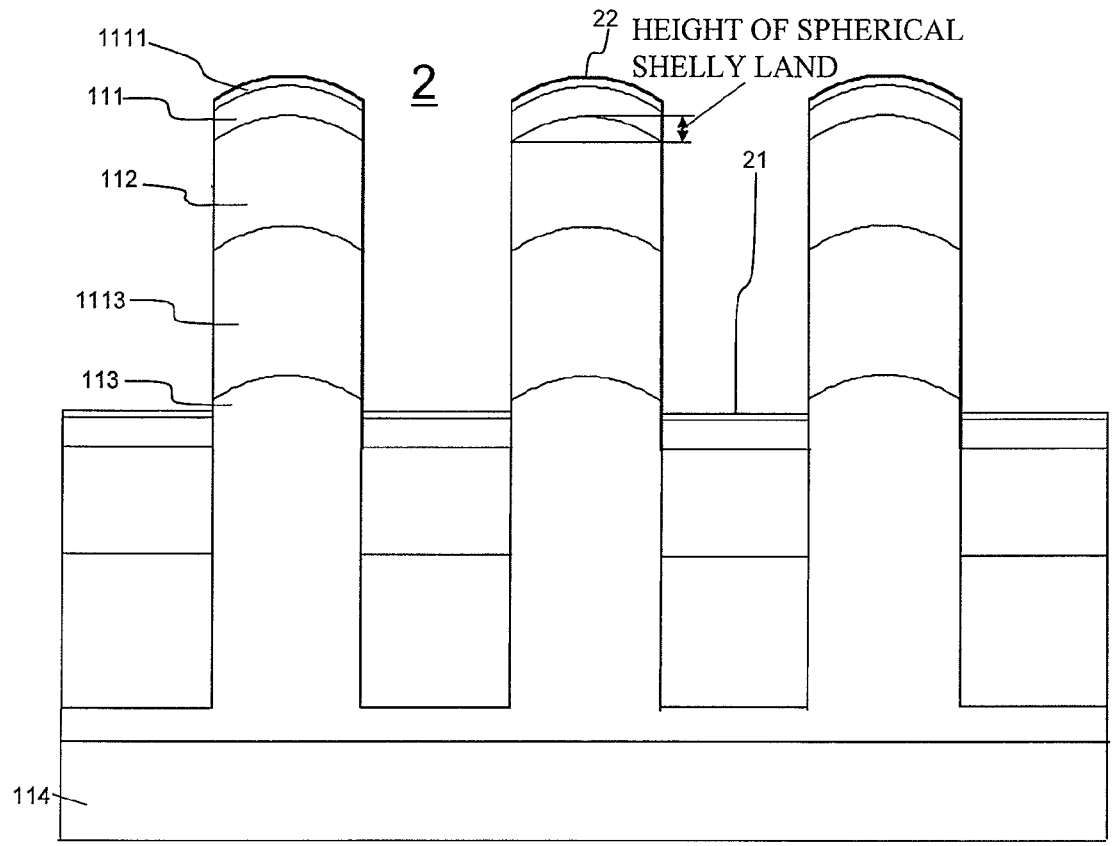
FIG. 3 is a schematic cross-sectional view of a magnetic recording medium according to Embodiment 2 of the present invention.
Figure 4:
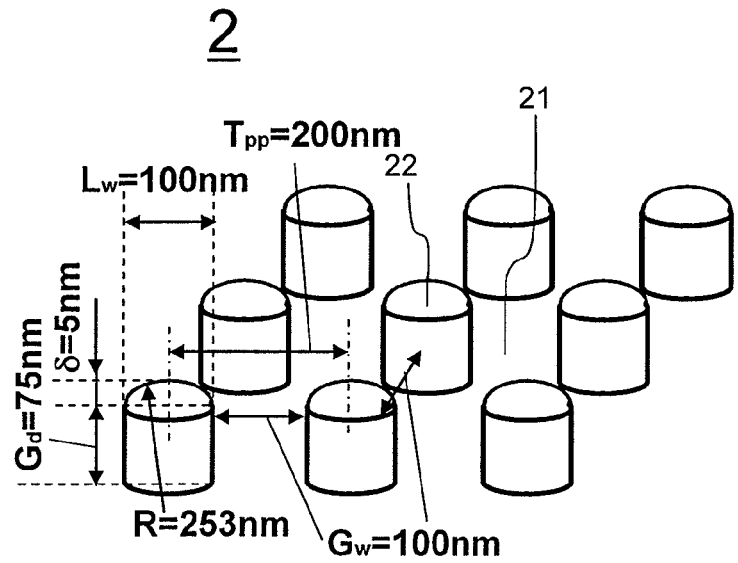
FIG. 4 is a schematic perspective view of the magnetic recording medium according to Embodiment 2 of the present invention.

FIG. 3 is a schematic cross-sectional view of a magnetic recording medium according to Embodiment 2 of the present invention, and FIG. 4 is a schematic perspective view thereof. A magnetic recording medium 2 of this embodiment is a patterned medium which has grooves 21 and patterns 22 and has respective recording bits formed by the patterns. Each of the patterns 22 has an overcoat 111, a magnetic layer 112, an underlayer 113 such as $SiO_2$, an underlayer 1113 such as a soft magnetic underlayer, and a non-magnetic substrate 114. A lubricant 1111 is applied onto a surface of the overcoat 111. The magnetic layer 112 is formed to have a spherical shape in a state where a film thickness thereof is fixed. As shown in FIG. 3, a length between a center portion of the magnetic layer 112 and side end portions thereof is defined as a height of spherical shelly land. FIG. 4 shows a dimensional example. A width Gw of the groove 21 is 100 nm, a depth Gd of the groove is 75 μm, a width Lw of the pattern 22 is 100 nm, and a track width Tp and a bit width Tpp, each of which is a distance between adjacent patterns, are about 200 nm. The height δ of spherical shelly land of the pattern 22 is 5 μm, and a curvature R of spherical shelly land is about 505 nm. The curvature R of spherical shelly land is expressed as follows by use of the width Lw of the pattern 22 and the height δ of spherical shelly land.

$$R=((Lw/2)^2+\delta^2)/(2\delta)$$

Figure 5:
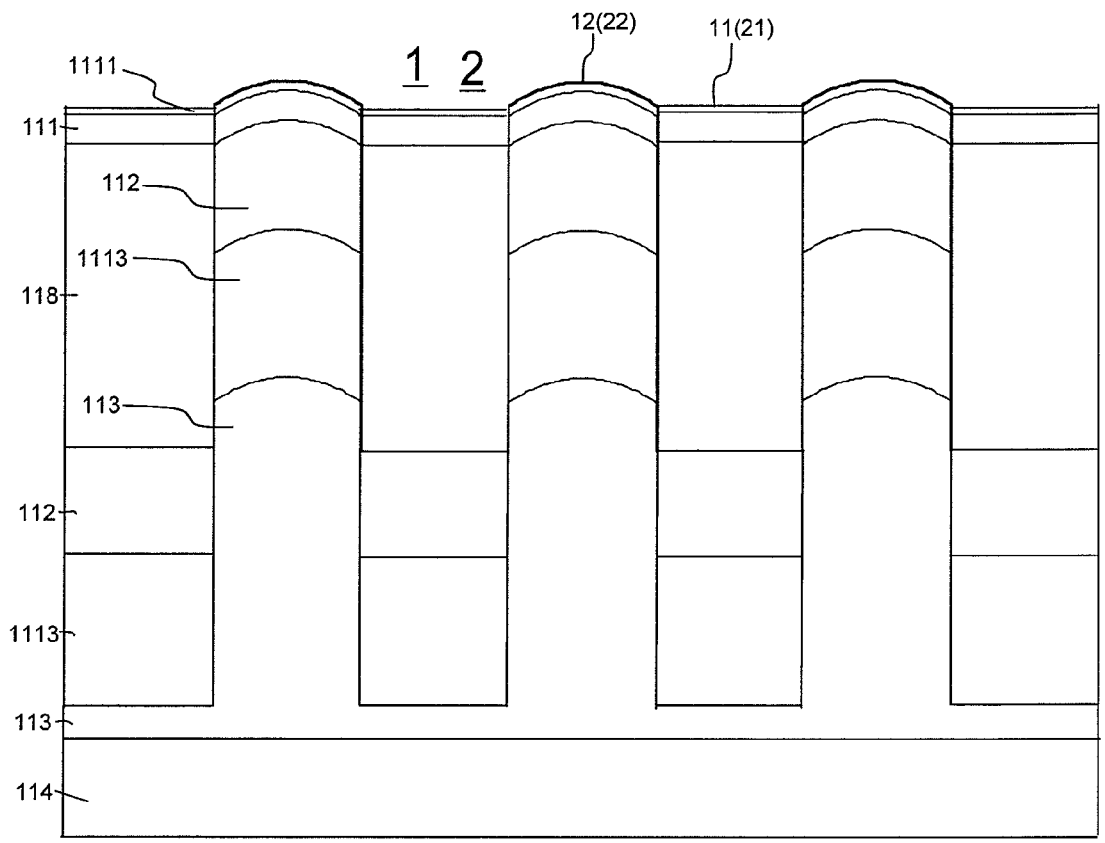
FIG. 5 is a schematic cross-sectional view of a magnetic recording medium according to Embodiment 3 of the present invention.

FIG. 5 is a schematic cross-sectional view of a magnetic recording medium according to Embodiment 3 of the present invention. A magnetic recording medium 1 or 2 of this embodiment has grooves 11 and lands 12 or has grooves 21 and patterns 22. The lands 12 or the patterns 22 are formed of an overcoat 111, a magnetic layer 112, an underlayer 113 such as $SiO_2$, an underlayer 1113 such as a soft magnetic underlayer, and a non-magnetic substrate 114. The grooves 11 or the grooves 21 are formed of the overcoat 111, a non-magnetic material 118, the magnetic layer 112, and the underlayer 1113 such as the soft magnetic underlayer. A lubricant 1111 is applied onto a surface of the overcoat 111. The medium of this embodiment is equivalent to one obtained by forming the overcoat 111 after the magnetic layer 112 is formed and the grooves 11 are filled with the non-magnetic material 118 in the discrete track medium of Embodiment 1 shown in FIGS. 1 and 2. Alternatively, the medium of this embodiment is equivalent to one obtained by forming the overcoat 111 after the magnetic layer 112 is formed and the grooves 21 are filled with the non-magnetic material 118 in the patterned medium of Embodiment 2 shown in FIGS. 3 and 4.

Figure 6:
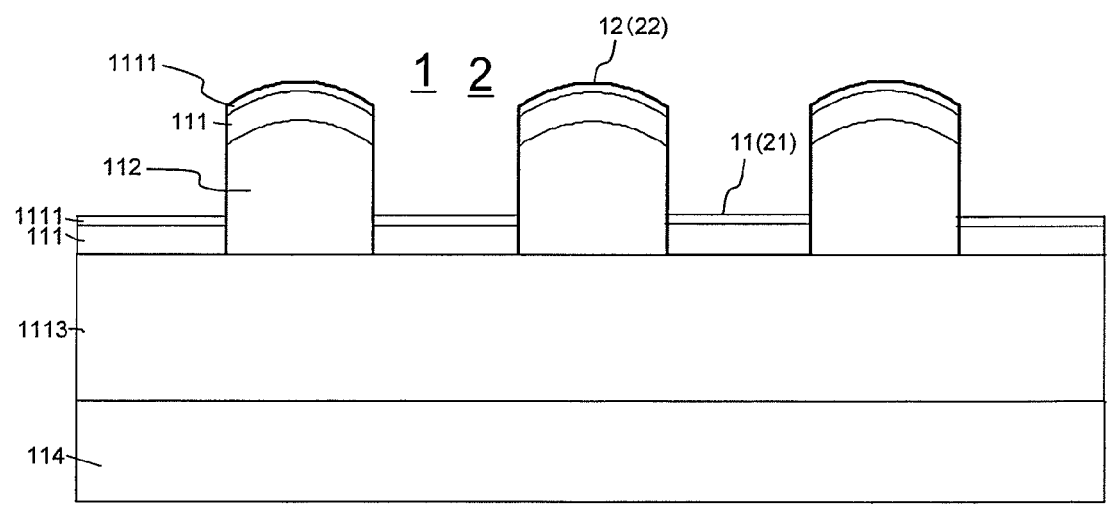
FIG. 6 is a schematic cross-sectional view of a magnetic recording medium according to Embodiment 4 of the present invention.

FIG. 6 is a schematic cross-sectional view of a magnetic recording medium according to Embodiment 4 of the present invention. A magnetic recording medium 1 or 2 of this embodiment has grooves 11 and lands 12 or has grooves 21 and patterns 22. The lands 12 or the patterns 22 are formed of an overcoat 111 and a magnetic layer 112. A lubricant 1111 is applied onto a surface of the overcoat 111. In the case of a discrete track medium, the lands 12 form tracks. Meanwhile, in the case of a patterned medium, the patterns form respective recording bits.

Figure 7:
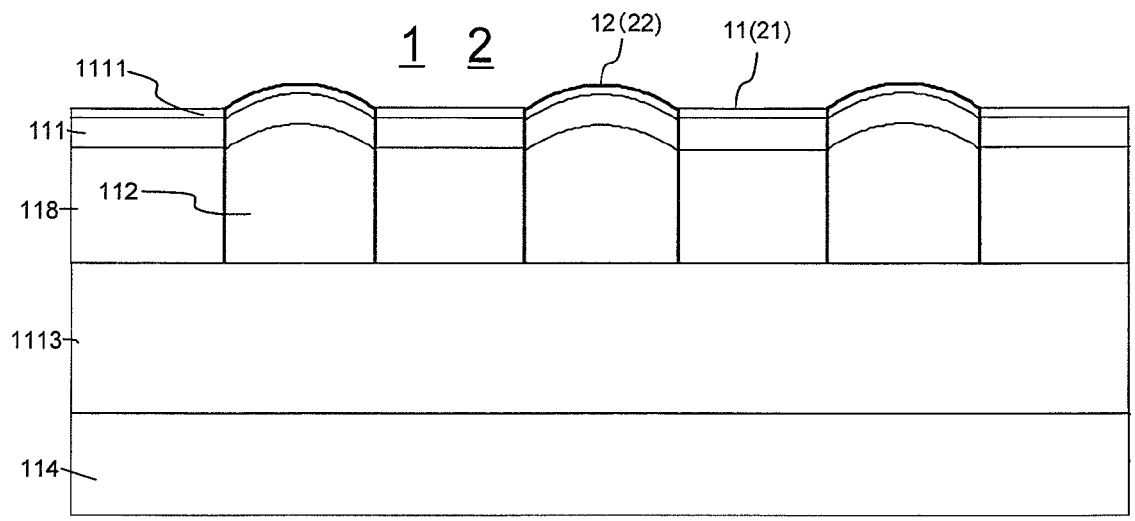
FIG. 7 is a schematic cross-sectional view of a magnetic recording medium according to Embodiment 5 of the present invention.

FIG. 7 is a schematic cross-sectional view of a magnetic recording medium according to Embodiment 5 of the present invention. A magnetic recording medium 1 or 2 of this embodiment has grooves 11 and lands 12 or has grooves 21 and patterns 22. The lands 12 or the patterns 22 are formed of an overcoat 111 and a magnetic layer 112. The grooves 11 or the grooves 21 are formed of the overcoat 111 and a non-magnetic material 118. A lubricant 1111 is applied onto a surface of the overcoat 111. In the case of a discrete track medium, the lands 12 form tracks. Meanwhile, in the case of a patterned medium, the patterns form respective recording bits.

Figure 8:
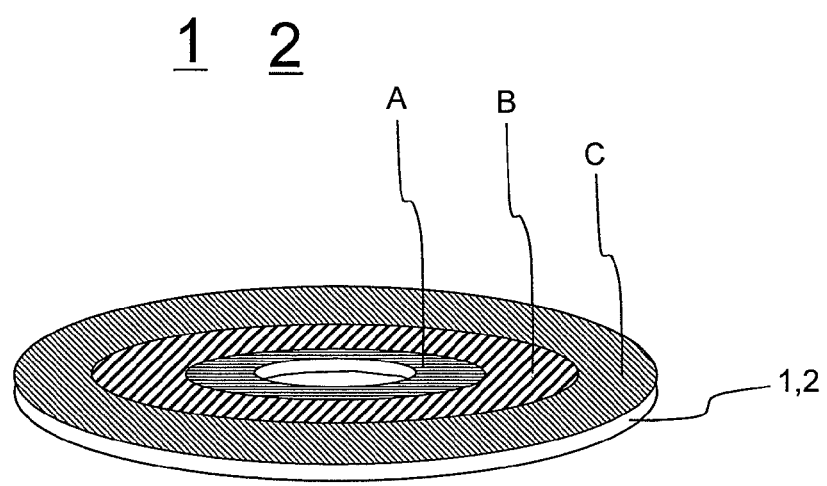
FIG. 8 is a schematic view of a magnetic recording medium according to Embodiment 6 of the present invention.

FIG. 8 is a schematic view of a magnetic recording medium according to Embodiment 6 of the present invention. A magnetic recording medium 1 or 2 is divided into at least three regions A to C in a radial direction. A height δc of cylindrical shelly land and a curvature Rc of cylindrical shelly land or a height δ of spherical shelly land and a curvature R of spherical shelly land vary between the respective regions. Furthermore, the height δc of cylindrical shelly land or the height δ of spherical shelly land is smallest in the middle region B with a small absolute value of δ yaw angle. Meanwhile, the height δc of cylindrical shelly land or the height δ of spherical shelly land in the innermost and outermost regions A and C where the absolute value of the yaw angle is increased is larger than that in the middle region. For example, the height δc of cylindrical shelly land or the height δ of spherical shelly land in each of the regions A and C is 5 nm, and the height δc of cylindrical shelly land or the height δ of spherical shelly land in the region B is 30 nm.

With reference to FIGS. 9 to 14, description will be given of effects achieved by the magnetic recording media of the present invention.

Figure 9:
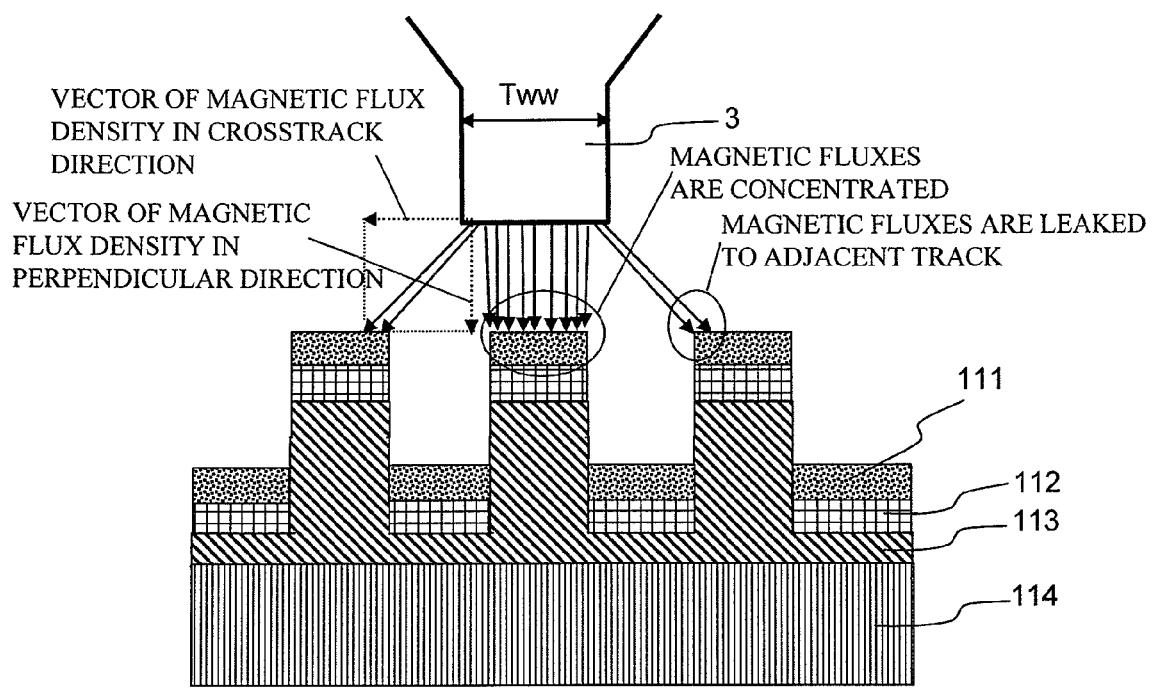
FIG. 9 is a schematic view of magnetic flux vectors when a magnetic field is applied to a conventional discrete track medium on its middle peripheral area with a yaw angle of 0° by a writer.
Figure 9:
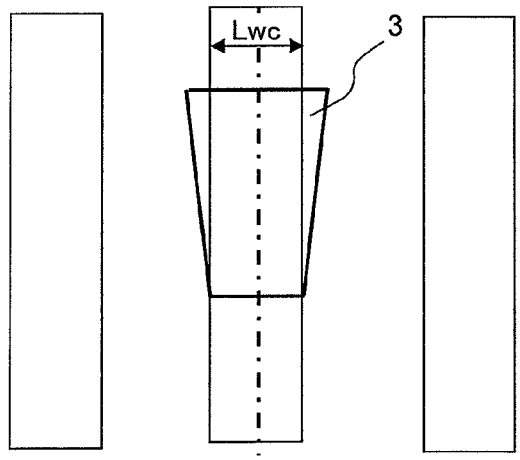
Figure 10:
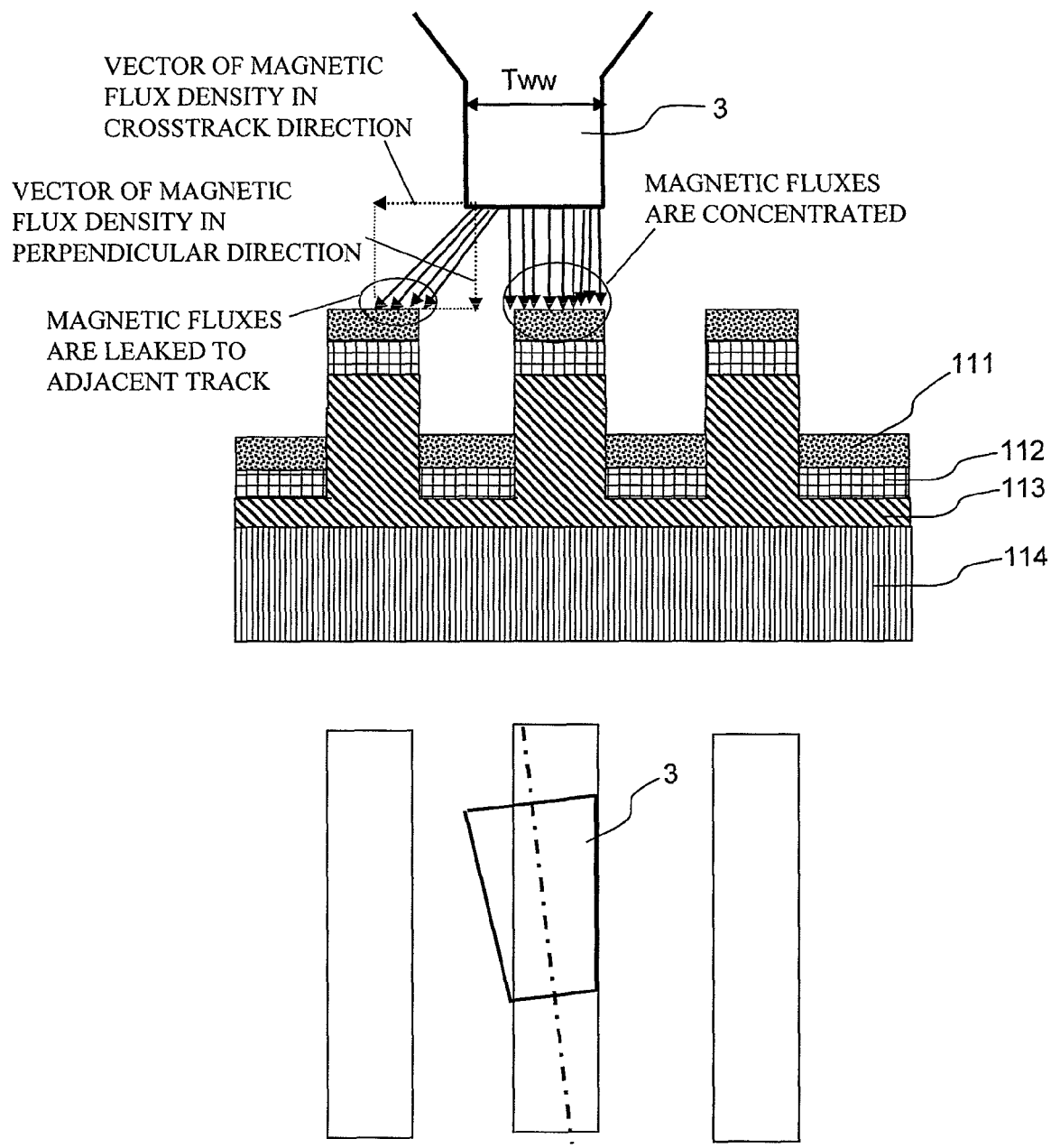
FIG. 10 is a schematic view of magnetic flux vectors when a magnetic field is applied by the writer to the conventional discrete track medium on its innermost and outermost where the absolute value of the yaw angle is increased.

FIG. 9 is a schematic view of magnetic flux vectors when a magnetic field is applied to a conventional discrete track medium on its middle peripheral area with a yaw angle of 0° by a writer. In the case of recording on the conventional discrete track medium by applying the magnetic field by use of a writer 3, since a the track width of the writer 3 Tww is larger than the land width Lwc, magnetic fluxes are concentrated on the land and also leaked to adjacent tracks from sides of the writer 3. When the magnetic fluxes are leaked to the adjacent tracks, information written into the medium is deleted. FIG. 10 is a schematic view of magnetic flux vectors when a magnetic field is applied by the writer to the conventional discrete track medium on its innermost and outermost where the absolute value of the yaw angle is increased. In the innermost and outermost regions where the absolute value of the yaw angle is increased, the magnetic fluxes are more easily leaked since the writer comes closer to the adjacent track as compared with the middle region where the yaw angle is 0°.

Figure 11A:
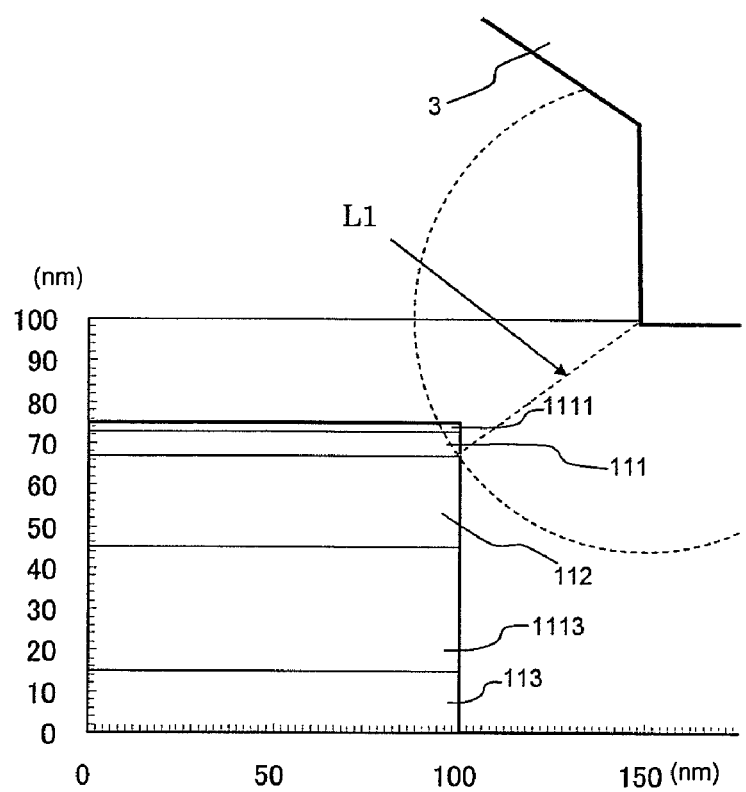
FIGS. 11A and 11B are views showing a distance between a magnetic layer of the conventional medium and the writer as well as a distance between a magnetic layer of the medium of the present invention and the writer, respectively.
Figure 11B:
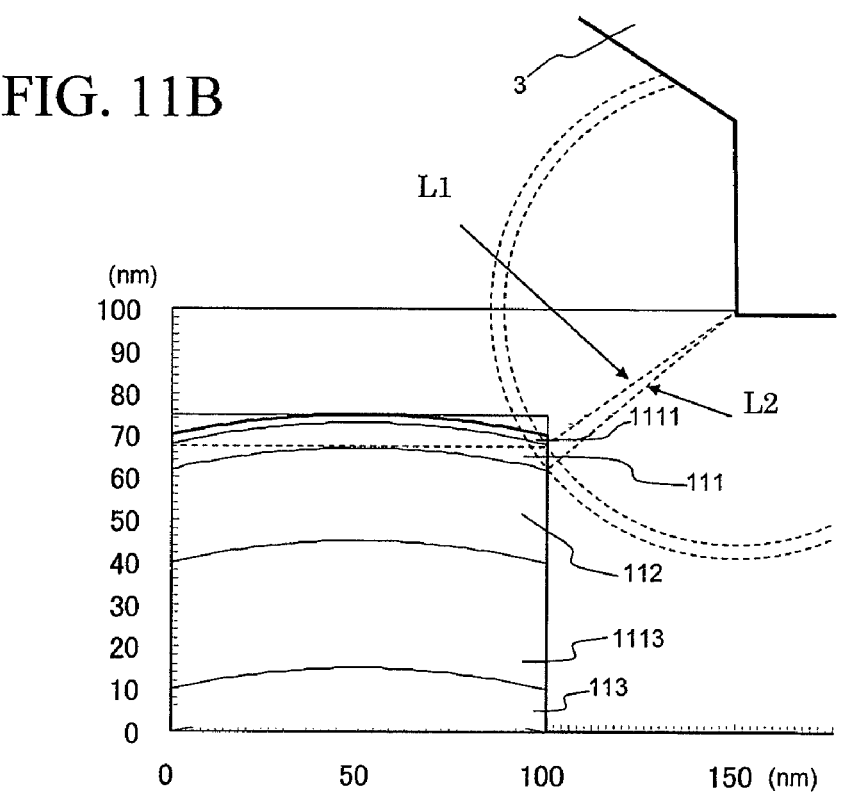
Figure 14A:
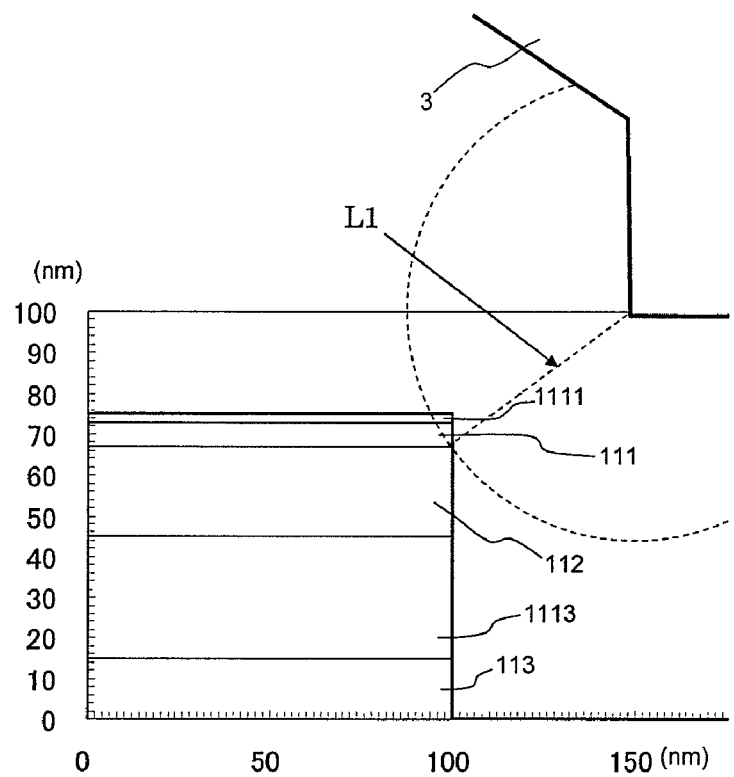
FIGS. 14A and 14B are views showing the distance between the magnetic layer of the conventional medium and the writer as well as a distance between a magnetic layer of the medium of the present invention and the writer, respectively.
Figure 14B:
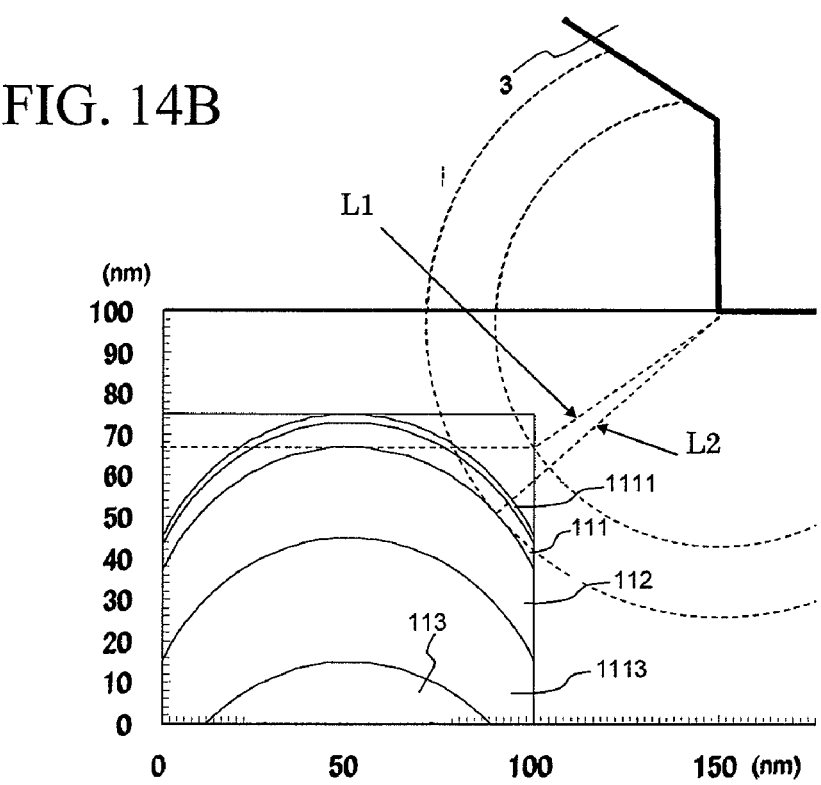

FIGS. 11 and 14 are views showing comparison of a distance from the magnetic layer 112 in the magnetic recording medium to the writer 3 between the discrete track medium of the present invention having the curved magnetic layer 112 and the conventional discrete track medium having a flat magnetic layer. FIGS. 11A and 11B are views showing comparison between the discrete track medium of the present invention in which the height δc of cylindrical shelly land is 5 nm and the conventional discrete track medium. Moreover, FIGS. 14A and 14B are views showing comparison between the discrete track medium of the present invention in which the height δc of cylindrical shelly land is 30 nm and the conventional discrete track medium. In FIGS. 11 and 14, L1 is a distance between the magnetic layer of the adjacent track in the conventional discrete track medium and the writer 3, and L2 is a distance between the magnetic layer of the adjacent track in the discrete track medium of the present invention and the writer 3.

Figure 12:
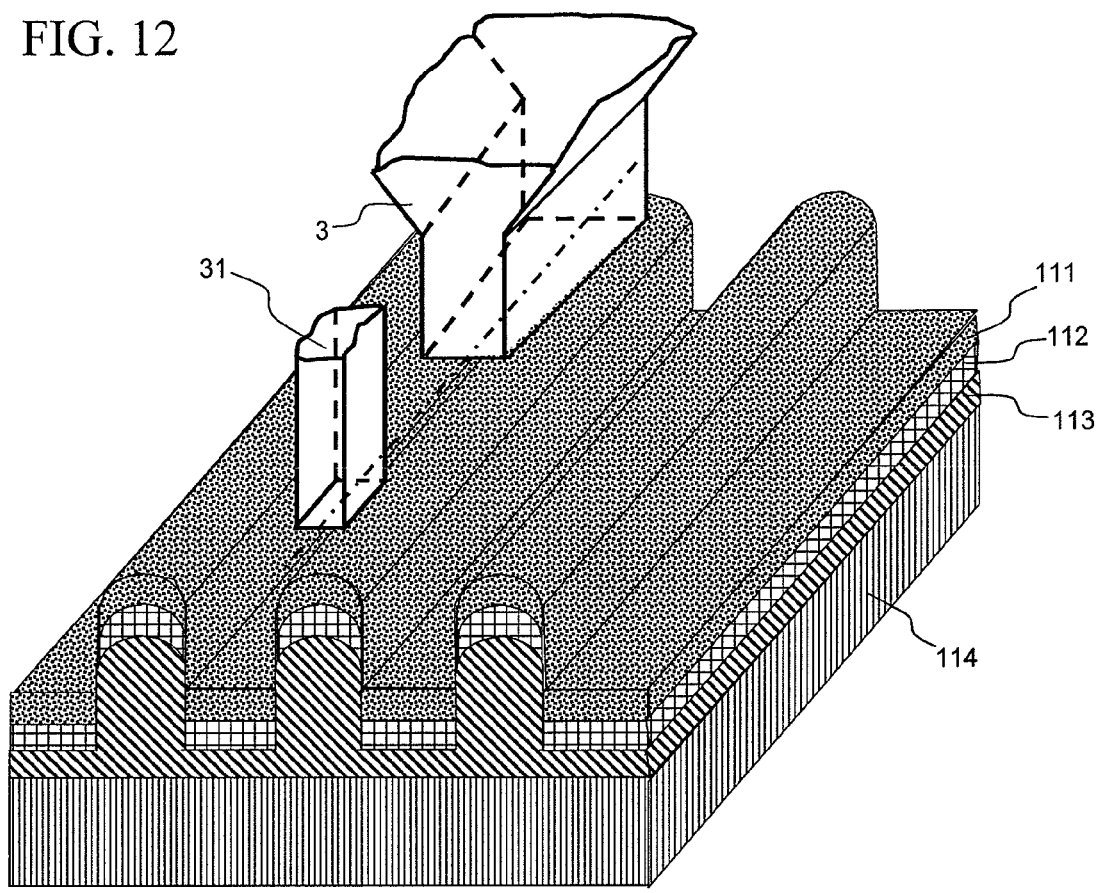
FIG. 12 is a schematic view showing a configuration of a magnetic head.
Figure 13:
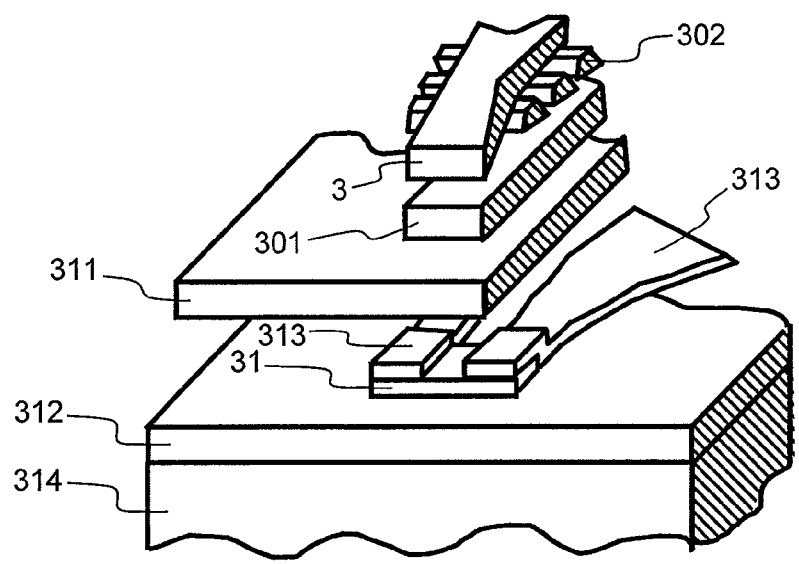
FIG. 13 is a schematic view showing the configuration of the magnetic head.

FIGS. 12 and 13 are schematic views showing a configuration of a magnetic head. The magnetic head includes the writer 3, a reader 31 of the magnetic head, a lower magnetic pole 301, a coil 302, an upper shield 311, a lower shield 312, electrode patterns 313 and a base 314.

As shown in FIGS. 11 and 14, the distance between the magnetic layer of the adjacent track and the writer 3 is larger in the discrete track medium according to Embodiment 1 of the present invention than in the conventional discrete track medium having the flat magnetic layer. Since magnetic field strength is reduced in inverse proportion to the distance squared, the magnetic fluxes are less likely to be leaked to the adjacent tracks in the discrete track medium according to Embodiment 1 of the present invention as compared with the conventional discrete track medium. Furthermore, in the discrete track medium according to Embodiment 1 of the present invention, the larger the height of cylindrical shelly land is, the less likely the magnetic fluxes are to be leaked to the adjacent tracks. Thus, it is required to increase the height δc of cylindrical shelly land towards the innermost or the outermost. The same effect is achieved in the case of the patterned medium according to Embodiment 2 of the present invention shown in FIGS. 3 and 4. A range of the height δc of cylindrical shelly land and the height δ of spherical shelly land in the magnetic recording media according to Embodiments 1 and 2 of the present invention is from 5 nm approximately equivalent to the thickness of the overcoat at which an effect of reducing meniscus adsorption starts to emerge to 30 nm required not to increase a magnetic spacing.

Figure 15A:
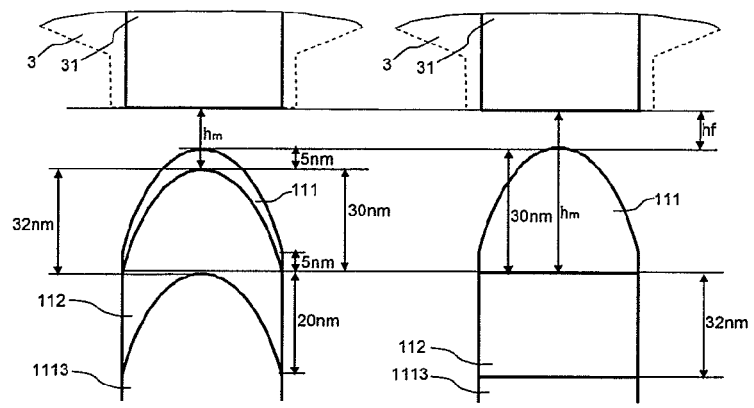
FIGS. 15A to 15C are views comparing a flying height of the conventional medium with that of the medium of the present invention.
Figure 15B:
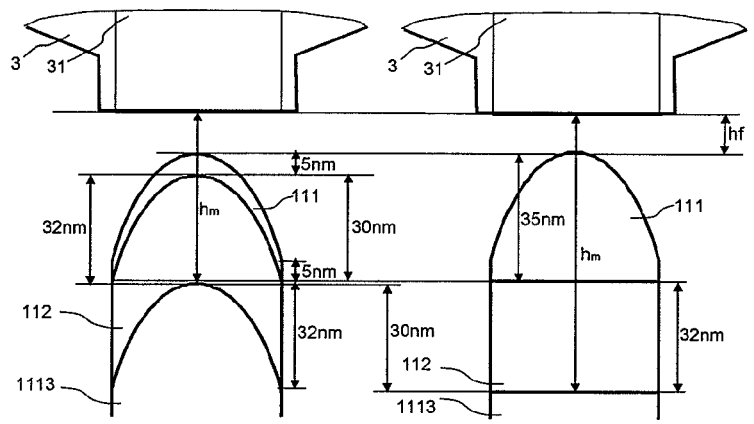

FIGS. 15A and 15B are views showing comparison of a magnetic spacing hm and a flying height hf at a position of the reader and writer in the magnetic head between the discrete track medium of the present invention having the curved magnetic layer and the conventional discrete track medium having the flat magnetic layer as well as the curved overcoat. The magnetic spacing hm, in the case of reproduction by use of a perpendicular magnetic recording system or in the case of recording and reproduction by use of a longitudinal magnetic recording system, is a distance from the surface of the magnetic layer 112 to the reader 31 in the magnetic head or to the writer 3. The magnetic spacing hm in the case of recording by use of the perpendicular magnetic recording system is a distance from the surface of the underlayer 1113 such as the soft magnetic underlayer to the writer 3. FIG. 15A shows the case of reproduction by use of the perpendicular magnetic recording system or the case of recording and reproduction by use of the longitudinal magnetic recording system. Meanwhile, FIG. 15B shows the case of recording by use of the perpendicular magnetic recording system.

As shown in FIGS. 15A and 15B, the magnetic spacing hm is smaller in the case of the magnetic recording medium according to Embodiment 1 of the present invention than in the case of the conventional discrete track medium, when both the recording media have the same cylindrical shelly land shape and the same flying height hf at a position of a reader and writer in a magnetic head slider, which is related to durability of a magnetic disk apparatus. For example, in both of the discrete track medium according to Embodiment 1 of the present invention and the conventional discrete track medium, the thickness of the overcoat 111 is set to 5 nm, the thickness of the magnetic layer 112 is set to 32 nm and the height $\delta c$ of cylindrical shelly land is set to 30 nm. In this case, when the flying height hf at the position of the reader and writer is set the same, a center portion of the overcoat is required to have a thickness of 35 nm in order to set the height $\delta c$ of cylindrical shelly land in the conventional discrete track medium to 30 nm. Thus, the magnetic spacing hm is increased by 30 nm that is the height $\delta c$ of cylindrical shelly land. Since magnetic field strength is reduced in inverse proportion to the magnetic spacing squared, it is found out that the discrete track medium according to Embodiment 1 of the present invention having a small magnetic spacing has a higher areal density.

Figure 15C:
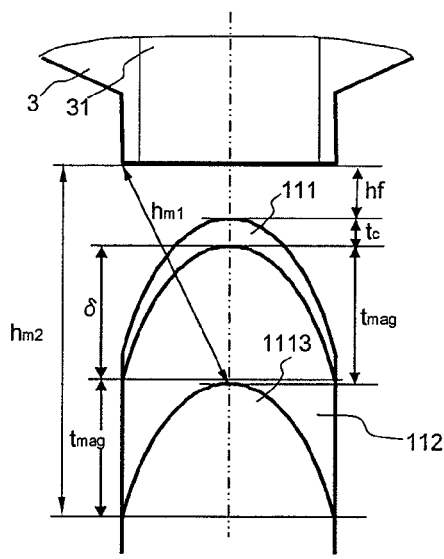

With reference to FIG. 15C, description will be given of a range of the height $\delta c$ of cylindrical shelly land in the discrete track medium according to Embodiment 1 of the present invention for preventing an increase in the magnetic spacing. Here, it is assumed that a distance from the end of the writer 3 to a center position of the underlayer 1113 such as the soft magnetic underlayer is a magnetic spacing hm1 and a distance from the end of the writer 3 to an end of the underlayer 1113 such as the soft magnetic underlayer is a magnetic spacing hm2. In this case, since the magnetic field strength is reduced in inverse proportion to the magnetic spacing squared, conditions expressed by the following formulas (1) to (3) are required so that all magnetic fluxes generated from the writer 3 in recording are concentrated on the center position of the underlayer 1113 such as the soft magnetic underlayer without reaching the end of the underlayer 1113 such as the soft magnetic underlayer.

$$h_{m1} > h_{m2} \quad (1)$$

$$h_{m1} = \sqrt{\left(\frac{L_{wc}}{2}\right)^2 + (h_f + t_c + t_{mag})^2} \quad (2)$$

$$h_{m2} = h_f + t_c + t_{mag} + \delta_c \quad (3)$$

Here, Lwc is the land width and the track width of the writer 3, tc is the thickness of the overcoat 111, and tmag is the thickness of the magnetic layer 112. The following formula (4) is obtained by solving the formulas (1) to (3).

$$\delta_c < -(h_f + t_c + t_{mag}) + \sqrt{(h_f + t_c + t_{mag})^2 + \left(\frac{L_{wc}}{2}\right)^2} \quad (4)$$

Accordingly, the range of the height $\delta c$ of cylindrical shelly land in the discrete track medium according to Embodiment 1 of the present invention for preventing an increase in the magnetic spacing is obtained by the formula (4). For example, in the case where Lwc=100 nm, tc=5 n, tmag=15 nm and hf=5 nm, the range of the height $\delta c$ of cylindrical shelly land in the discrete track medium according to Embodiment 1 of the present invention for preventing an increase in the magnetic spacing is set to 30 nm or less.

Although, here, the discrete track medium has been described, the same goes for the patterned medium of the present invention having the curved magnetic layer and the patterned medium having the flat magnetic layer as well as the curved overcoat.

With reference to FIGS. 16 to 18, description will be given of another effect achieved by the magnetic recording media of the present invention.

Figure 16A:
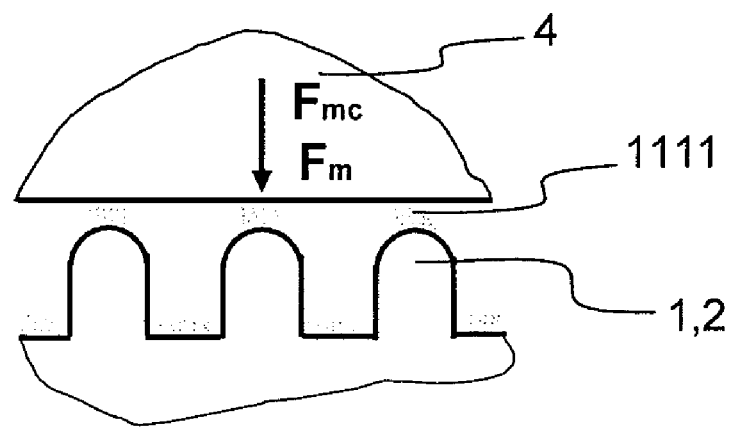
FIGS. 16A and 16B are cross-sectional views when the medium of the present invention and the conventional medium come into contact with a magnetic head slider, respectively.
Figure 16B:
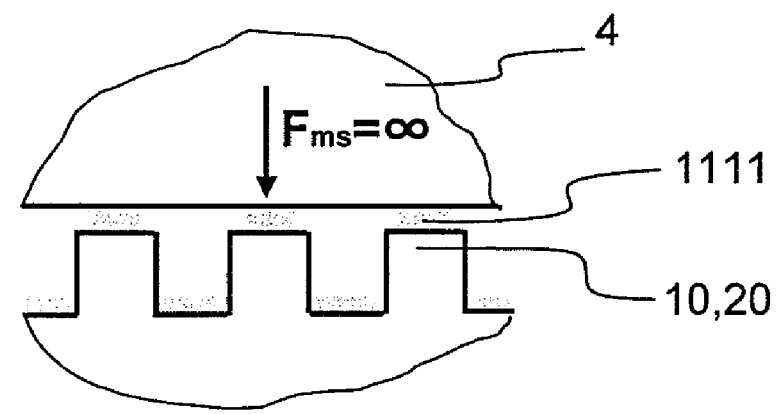

FIG. 16A is a schematic cross-sectional view when the discrete track medium 1 or the patterned medium 2 according to the present invention comes into contact with a magnetic head slider 4. FIG. 16B is a schematic cross-sectional view when a conventional discrete track medium 10 or a conventional patterned medium 20 comes into contact with the magnetic head slider 4. The lubricant 1111 is applied onto a surface of each of the media.

A meniscus adsorptive force Fmc of the lubricant is generated when the magnetic head slider and the discrete track medium come into contact with each other. Meanwhile, a meniscus adsorptive force Fm of the lubricant is generated when the magnetic head slider and the patterned medium come into contact with each other. The meniscus adsorptive forces Fmc and Fm are expressed by Fmc=$8\pi\gamma Rc$ and Fm=$4 7\pi\gamma R$, respectively. $\gamma$ is a surface energy of the lubricant, and $\gamma$=0.022 N/m in the case of a lubricant Z-dol. The curvature Rc of cylindrical shelly land is expressed by Rc= $((L_{wc}/2)^2+\delta c^2)/(2\delta c)$ by use of the land width Lwc and the height $\delta c$ of cylindrical shelly land. The curvature R of spherical shelly land is expressed by R=$((Lw/2)^2+\delta^2)/(2\delta)$ by use of the pattern width Lw and the height $\delta$ of spherical shelly land.

Figure 17A:
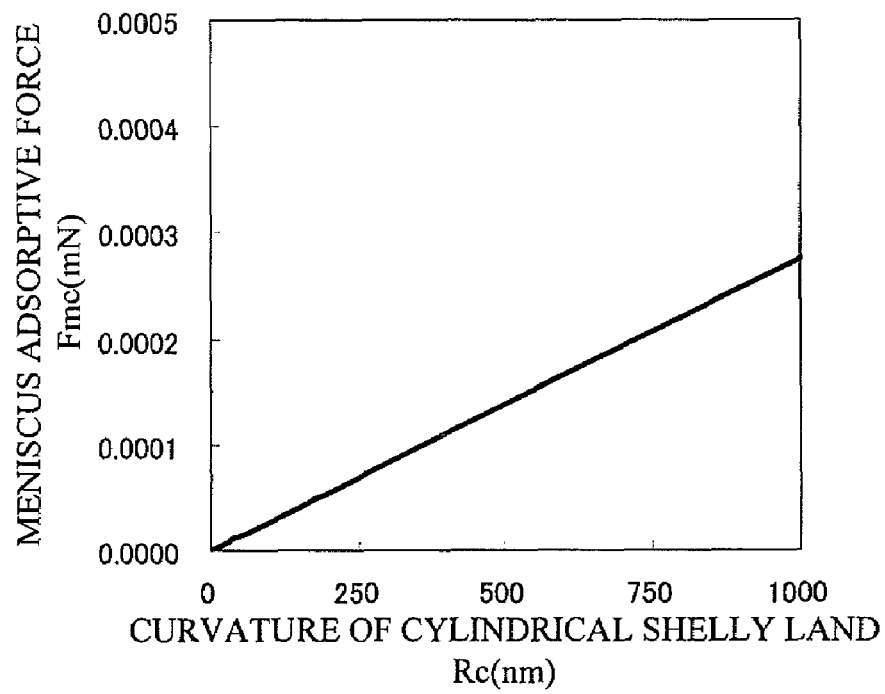
FIGS. 17A and 17B are graphs showing calculation results on relationships between a meniscus adsorptive force and a curvature of cylindrical shelly land as well as between the meniscus adsorptive force and a height of cylindrical shelly land.
Figure 17B:
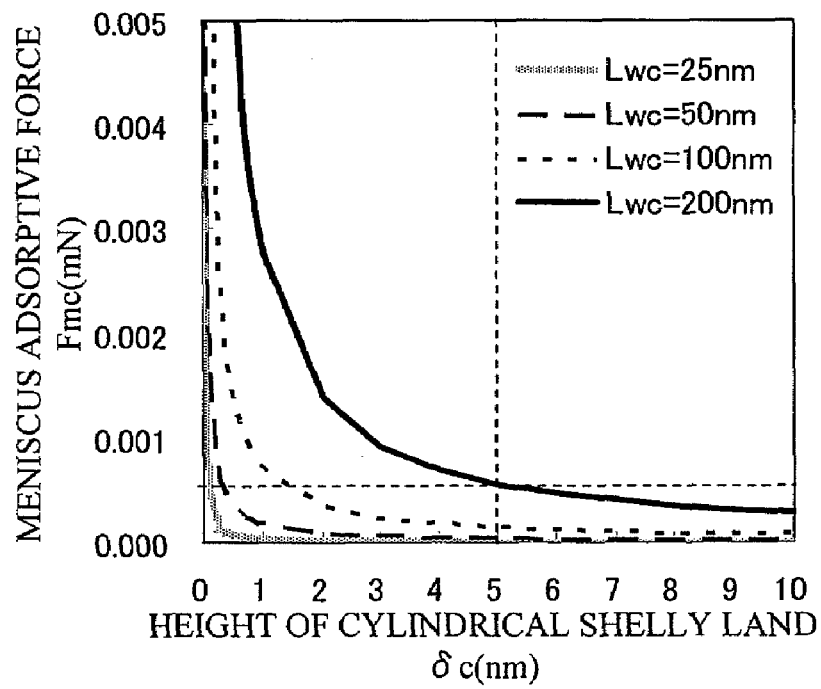

FIG. 17A shows calculation results on a relationship between the meniscus adsorptive force Fmc and the curvature Rc of cylindrical shelly land by use of the equation described above when the lubricant Z-dol ($\gamma$=0.022 N/m) is used. Moreover, FIG. 17B shows calculation results on a relationship between the meniscus adsorptive force Fmc and the height $\delta c$ of cylindrical shelly land by use of the equation described above when the lubricant Z-dol ($\gamma$=0.022 N/m) is used. It is found out from these graphs that the smaller the curvature Rc of cylindrical shelly land and the larger the height δc of cylindrical shelly land, the smaller the meniscus adsorptive force Fmc becomes. In the case of the magnetic recording medium (Lwc=100 nm and δc=5 nm) of Embodiment 1, the meniscus adsorptive force Fmc is set to 0.00014 mN. In the case of the conventional magnetic recording medium in which Rc=∞, the meniscus adsorptive force Fmc becomes infinite. Accordingly, since the magnetic recording medium of Embodiment 1 comes into contact with the slider on its cylindrical shelly lands having a large height, the meniscus adsorptive force is reduced as compared with the conventional discrete track medium. Thus, slider vibration due to an adsorption phenomenon with the medium can be reduced, and a flying height of the slider can be reduced.

Figure 18A:
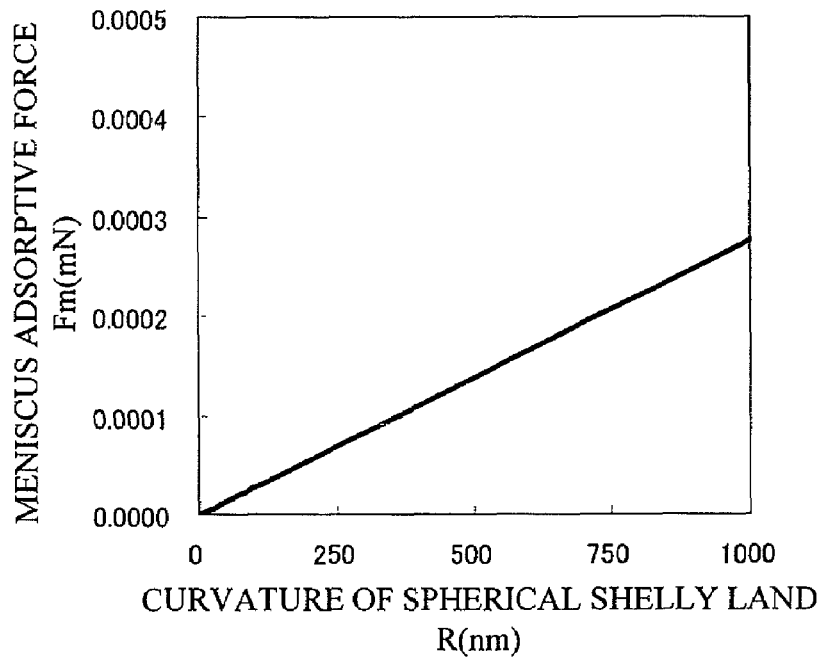
FIGS. 18A and 18B are graphs showing calculation results on relationships between a meniscus adsorptive force and a curvature of spherical shelly land as well as between the meniscus adsorptive force and a height of spherical shelly land.
Figure 18B:
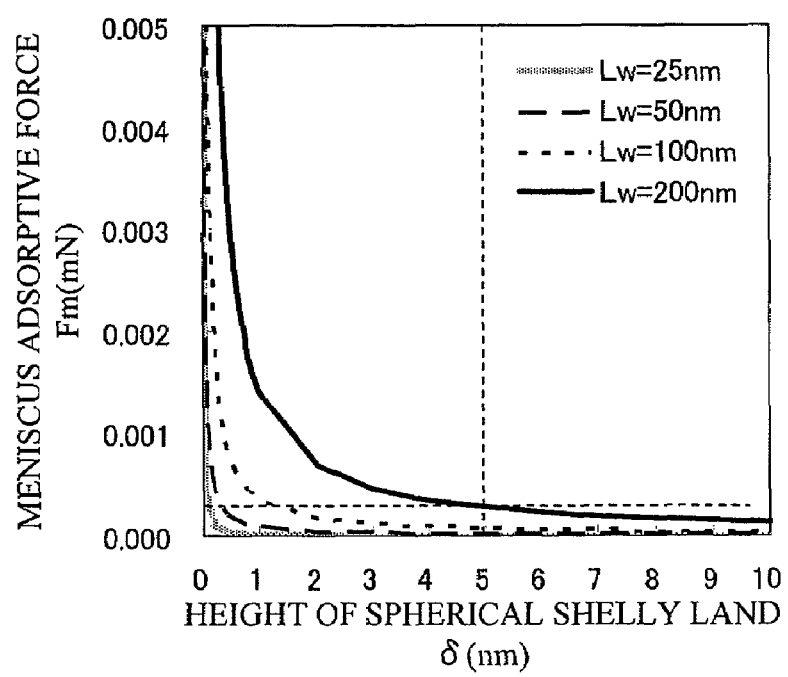

FIG. 18A shows calculation results on a relationship between the meniscus adsorptive force Fm and the curvature R of spherical shelly land by use of the equation described above when the lubricant Z-dol (γ=0.022 N/m) is used. Moreover, FIG. 18B shows calculation results on a relationship between the meniscus adsorptive force Fm and the height δ of spherical shelly land by use of the equation described above when the lubricant Z-dol (γ=0.022 N/m) is used. It is found out from these graphs that the smaller the curvature R of spherical shelly land and the larger the height δ of spherical shelly land, the smaller the meniscus adsorptive force Fm becomes. In the case of the magnetic recording medium of Embodiment 2, the meniscus adsorptive force Fm is reduced to 0.00007 mN. In the case of the conventional magnetic recording medium in which R=∞, the meniscus adsorptive force Fm also becomes infinite. Accordingly, since the magnetic recording medium of Embodiment 2 comes into contact with the slider on its spherical shelly lands having a large height, the meniscus adsorptive force is reduced as compared with the conventional patterned medium. Thus, slider vibration due to an adsorption phenomenon with the medium can be reduced, and a flying height of the slider can be reduced.

Particularly, it is found out from FIGS. 18A and 18B that, when the height δc of cylindrical shelly land is set to 5 nm or more or when the height δ of spherical shelly land is set to 5 nm or more, the effect of reducing the meniscus adsorptive force significantly emerges and both of Fmc and Fm are set to 0.0006 mN or less.

In order to prevent adsorption of the flying slider on the medium surface even if the meniscus adsorptive force Fm is generated when the flying slider comes close to the lubricant on the medium surface, it is required to set the meniscus adsorptive force Fm to be significantly smaller than an air-bearing force of the flying slider. A currently used suspension preload is about 10 to 30 mN. The air-bearing force of the flying slider is also approximately the same as the suspension preload. When the height δc of cylindrical shelly land is set to 5 nm or less, an effect of significantly reducing the meniscus adsorptive force Fm to 0.006% or less as compared with the air-bearing force of 10 mN is achieved. Thus, the range of the height δc of cylindrical shelly land is set to 5 nm or less.

With reference to FIGS. 19A to 19F, description will be given of a method for manufacturing the magnetic recording media according to Embodiments 1 and 2 of the present invention. FIGS. 19A to 19F show the method for manufacturing the discrete track medium of Embodiment 1 having the lands and the grooves. Meanwhile, in the case of manufacturing the patterned medium of Embodiment 2, the patterns which form the respective recording bits are formed instead of the lands which form the tracks.

(a) An underlayer 113 such as $SiO_2$ is formed by spin coating on a non-magnetic substrate 114. Thereafter, a resist 115 is formed by spin coating on the underlayer 113 such as $SiO_2$.

(b) By use of an electron beam lithography method or a photolithography method, the resist 115 is formed into a predetermined shape of lands or grooves.

(c) The non-magnetic substrate 114 having the resist 115 formed thereon is placed on a hot plate 117 heated to about 120 to 180° C. for about 15 to 60 minutes.

(d) When the resist 115 is remelted, a surface tension thereof allows the lands or the grooves to be formed into a predetermined cylindrical shelly shape or spherical shelly shape.

(e) The resist 115 having the cylindrical shelly or spherical shelly lands or grooves is subjected to sputtering by use of a reactive ion sputtering method to form the underlayer 113 such as $SiO_2$ into the cylindrical shelly or spherical shelly shape.

(f) An underlayer 1113 such as a soft magnetic underlayer, a magnetic layer 112, an overcoat 111 and a lubricant 1111 are formed on the underlayer 113 such as $SiO_2$ having the cylindrical shelly or spherical shelly lands or grooves by sputtering using the reactive ion sputtering method.

With reference to FIGS. 20A to 20D, description will be given of another method for manufacturing the magnetic recording media according to Embodiments 1 and 2 of the present invention. FIGS. 20A to 20D show the method for manufacturing the discrete track medium of Embodiment 1 having the lands and the grooves. Meanwhile, in the case of manufacturing the patterned medium of Embodiment 2, the patterns which form the respective recording bits are formed instead of the lands which form the tracks.

(a) An underlayer 113 such as $SiO_2$ is formed by spin coating on a non-magnetic substrate 114. Thereafter, a resist 115 is formed by spin coating on the underlayer 113 such as $SiO_2$.

(b) By use of the electron beam lithography method or the photolithography method, the resist 115 is formed into cylindrical shelly or spherical shelly lands or grooves by extending exposure time or developing time.

(c) The resist 115 having the cylindrical shelly or spherical shelly lands or grooves is subjected to sputtering by use of the reactive ion sputtering method to form the underlayer 113 such as $SiO_2$ into the cylindrical shelly or spherical shelly shape.

(d) An underlayer 1113 such as a soft magnetic underlayer, a magnetic layer 112, an overcoat 111 and a lubricant 1111 are formed on the underlayer 113 such as $SiO_2$ having the cylindrical shelly or spherical shelly lands or grooves by sputtering using the reactive ion sputtering method.

With reference to FIGS. 21A to 21H, description will be given of another method for manufacturing the magnetic recording media according to Embodiments 1 and 2 of the present invention. FIGS. 21A to 21H show the method for manufacturing the discrete track medium of Embodiment 1 having the lands and the grooves. Meanwhile, in the case of manufacturing the patterned medium of Embodiment 2, the patterns which form the respective recording bits are formed instead of the lands which form the tracks.

(a) An underlayer 113 such as $SiO_2$ is formed by spin coating on a non-magnetic substrate 114. Thereafter, a resist 115 is formed by spin coating on the underlayer 113 such as $SiO_2$.

(b), (c) and (d) By use of a nanoimprint method, pressure is applied on the resist 115 by a mold 116 to form the resist 115 into a predetermined shape of lands or grooves.

(e) The non-magnetic substrate 114 having the resist 115 formed thereon is placed on a hot plate 117 heated to about 120 to 180° C. for about 15 to 60 minutes.

(f) When the resist 115 is remelted, a surface tension thereof allows the lands or the grooves to be formed into a predetermined cylindrical shelly shape or spherical shelly shape.

(g) The resist 115 having the cylindrical shelly or spherical shelly lands or grooves is subjected to sputtering by use of the reactive ion sputtering method to form the underlayer 113 such as $SiO_2$ into the cylindrical shelly or spherical shelly shape.

(h) An underlayer 1113 such as a soft magnetic underlayer, a magnetic layer 112, an overcoat 111 and a lubricant 1111 are formed on the underlayer 113 such as $SiO_2$ having the cylindrical shelly or spherical shelly lands or grooves by sputtering using the reactive ion sputtering method.

With reference to FIGS. 22A to 22F, description will be given of another method for manufacturing the magnetic recording media according to Embodiments 1 and 2 of the present invention. FIGS. 22A to 22F show the method for manufacturing the discrete track medium of Embodiment 1 having the lands and the grooves. Meanwhile, in the case of manufacturing the patterned medium of Embodiment 2, the patterns which form the respective recording bits are formed instead of the lands which form the tracks.

(a) An underlayer 113 such as $SiO_2$ is formed by spin coating on a non-magnetic substrate 114. Thereafter, a resist 115 is formed by spin coating on the underlayer 113 such as $SiO_2$.

(b), (c) and (d) By use of the nanoimprint method, pressure is applied on the resist 115 by a mold 116 having a predetermined cylindrical shelly or spherical shelly shape to form the resist 115 into lands or grooves having a predetermined cylindrical shelly or spherical shelly shape.

(e) The resist 115 having the cylindrical shelly or spherical shelly lands or grooves is subjected to sputtering by use of the reactive ion sputtering method to form the underlayer 113 such as $SiO_2$ into the cylindrical shelly or spherical shelly shape.

(f) An underlayer 1113 such as a soft magnetic underlayer, a magnetic layer 112, an overcoat 111 and a lubricant 1111 are formed on the underlayer 113 such as $SiO_2$ having the cylindrical shelly or spherical shelly lands or grooves by sputtering using the reactive ion sputtering method.

With reference to FIGS. 23A to 23E, description will be given of a method for manufacturing a cylindrical shelly or spherical shelly mold 116 for the magnetic recording media according to Embodiments 1 and 2 of the present invention. FIGS. 23A to 23E show the method for manufacturing the discrete track medium of Embodiment 1 having the lands and the grooves. Meanwhile, in the case of manufacturing the patterned medium of Embodiment 2, the patterns which form the respective recording bits are formed instead of the lands which form the tracks.

(a) An underlayer 113 such as $SiO_2$ is formed by spin coating on a non-magnetic substrate 114. Thereafter, a resist 115 is formed by spin coating on the underlayer 113 such as $SiO_2$. As a material of the non-magnetic substrate 114, quartz or the like is used in the case of an optical imprint method and a silicon substrate or the like is used in the case of a thermal imprint method.

(b) By use of the electron beam lithography method or the photolithography method, the resist 115 is formed into a predetermined shape of lands or grooves.

(c) The non-magnetic substrate 114 having the resist 115 formed thereon is placed on a hot plate 117 heated to about 120 to 180° C. for about 15 to 60 minutes.

(d) When the resist 115 is remelted, a surface tension thereof allows the lands or the grooves to be formed into a predetermined cylindrical shelly shape or spherical shelly shape.

(e) The resist 115 having the cylindrical shelly or spherical shelly lands or grooves is subjected to sputtering by use of the reactive ion sputtering method to form the underlayer 113 such as $SiO_2$ into the cylindrical shelly or spherical shelly shape. The non-magnetic substrate 114 having the cylindrical shelly or spherical shelly underlayer 113 such as $SiO_2$ is used as a mold 116 having a cylindrical shelly or spherical shelly shape.

With reference to FIGS. 24A to 24I, description will be given of a method for manufacturing the magnetic recording medium according to Embodiment 3 of the present invention.

(a) An underlayer 113 such as $SiO_2$ is formed by spin coating on a non-magnetic substrate 114. Thereafter, a resist 115 is formed by spin coating on the underlayer 113 such as $SiO_2$.

(b) By use of the electron beam lithography method or the photolithography method, the resist 115 is formed into a predetermined shape of lands or grooves.

(c) The non-magnetic substrate 114 having the resist 115 formed thereon is placed on a hot plate 117 heated to about 120 to 180° C. for about 15 to 60 minutes.

(d) When the resist 115 is remelted, a surface tension thereof allows the lands or the grooves to be formed into a predetermined cylindrical shelly shape or spherical shelly shape.

(e) The resist 115 having the cylindrical shelly or spherical shelly lands or grooves is subjected to sputtering by use of the reactive ion sputtering method to form the underlayer 113 into the cylindrical shelly or spherical shelly shape.

(f) An underlayer 1113 such as a soft magnetic underlayer and a magnetic layer 112 are formed on the underlayer 113 such as $SiO_2$ having the cylindrical shelly or spherical shelly lands or grooves.

(g) The magnetic layer 112 having the cylindrical shelly or spherical shelly lands or grooves is subjected to sputtering by use of the reactive ion sputtering method to fill the grooves with a non-magnetic material 118 such as $SiO_2$.

(h) By use of an ion etching method, the non-magnetic material 118 is removed until the magnetic layer 112 is exposed.

(i) An overcoat 111 and a lubricant 1111 are formed on the non-magnetic material 118 and the exposed magnetic layer 112 by sputtering using the reactive ion sputtering method.

Figure 25A:
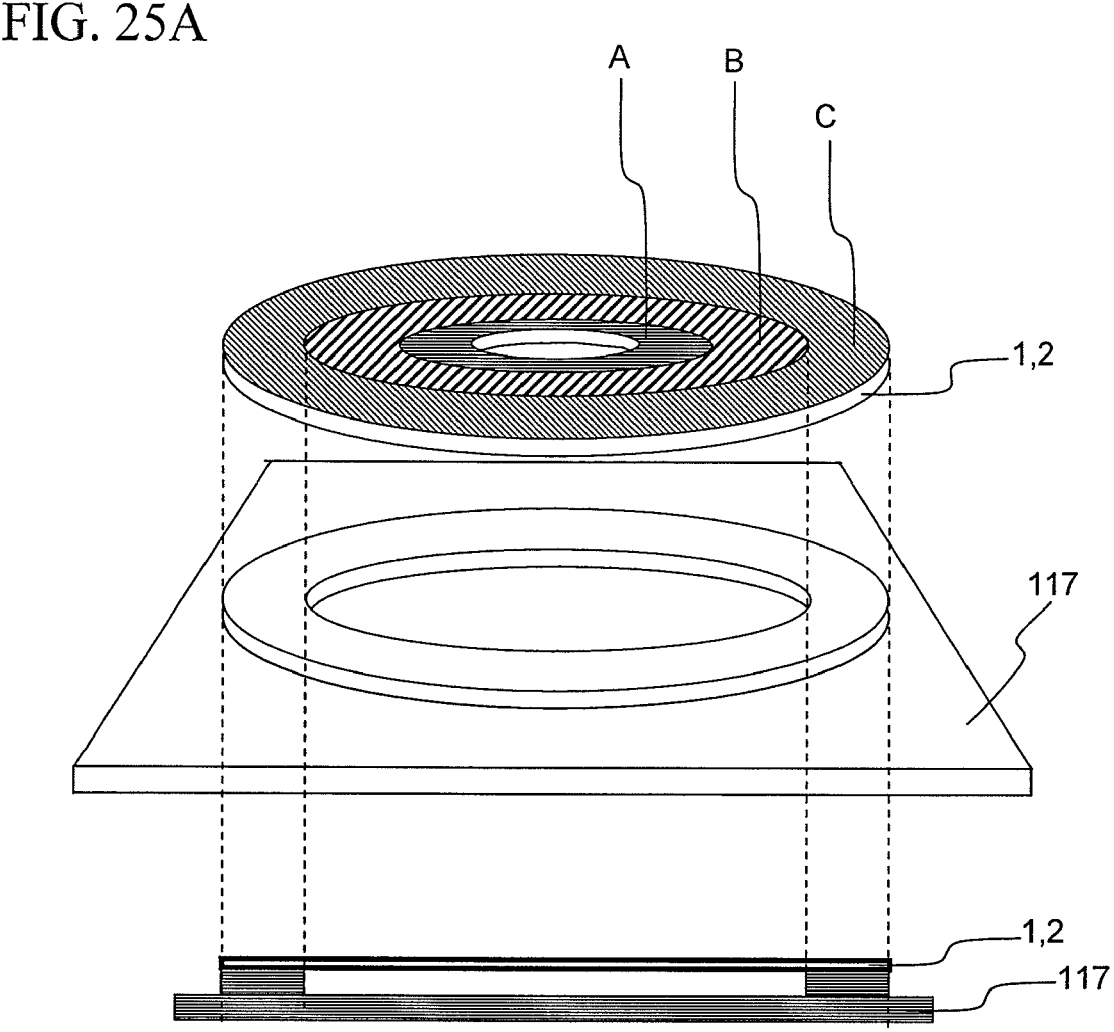
FIGS. 25A to 25C are explanatory views of a method for manufacturing the magnetic recording medium of the present invention.
Figure 25B:
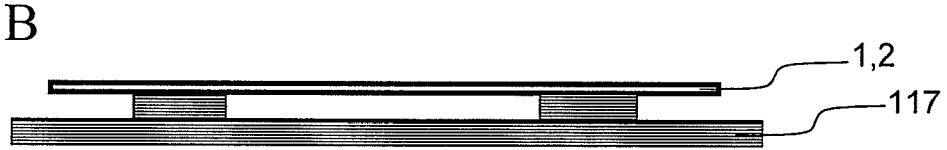
Figure 25C:
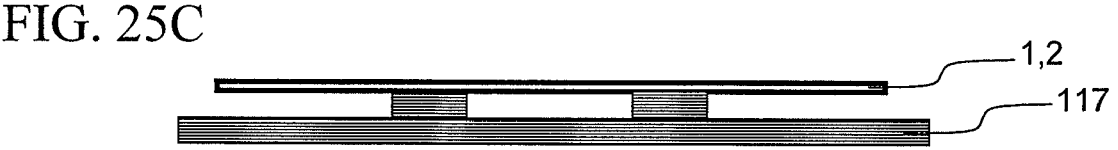

With reference to FIGS. 25A to 25C, description will be given of a method for manufacturing the magnetic recording medium according to Embodiment 6 of the present invention.

Figure 19A:
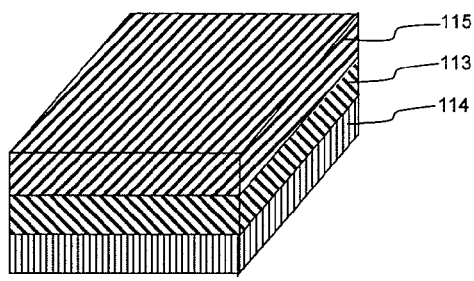
FIGS. 19A to 19F are explanatory views of a method for manufacturing the magnetic recording medium of the present invention.
Figure 19B:
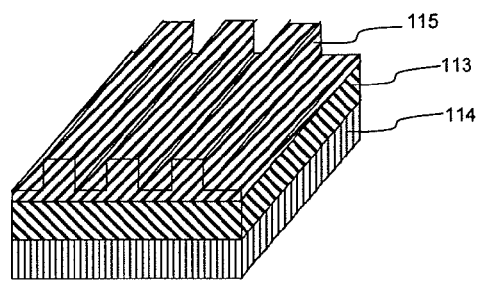
Figure 19C:
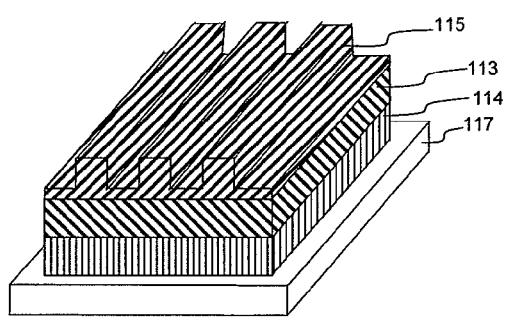
Figure 19D:
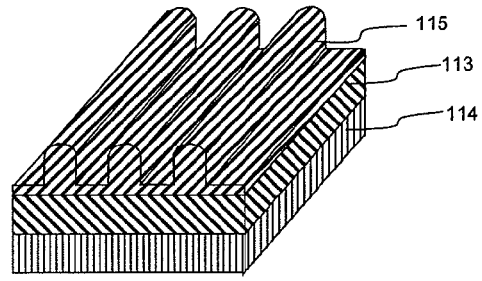
Figure 19E:
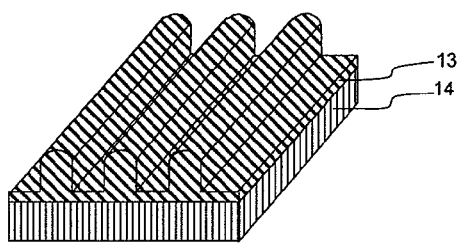
Figure 19F:
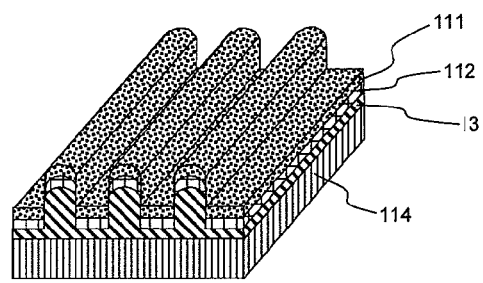
Figure 20A:
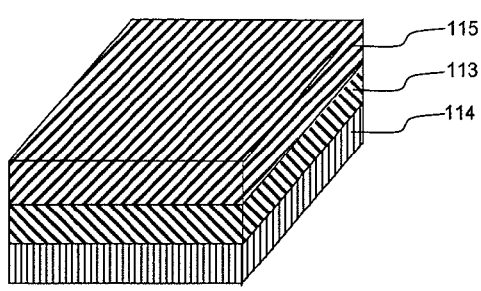
FIGS. 20A to 20D are explanatory views of another method for manufacturing the magnetic recording medium of the present invention.
Figure 20B:
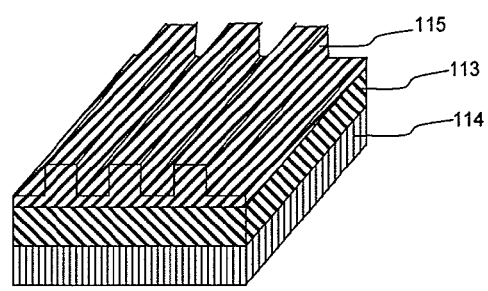
Figure 20C:
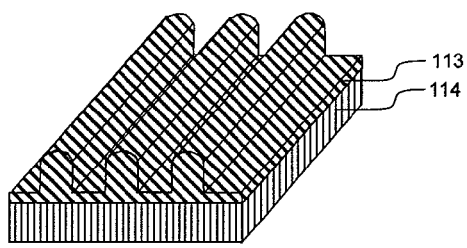
Figure 20D:
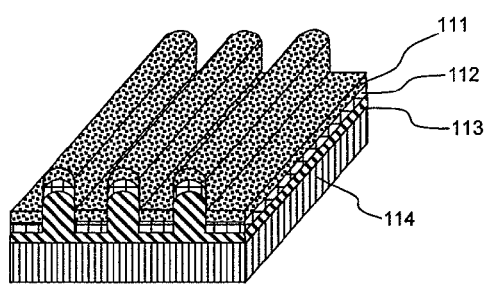
Figure 21A:
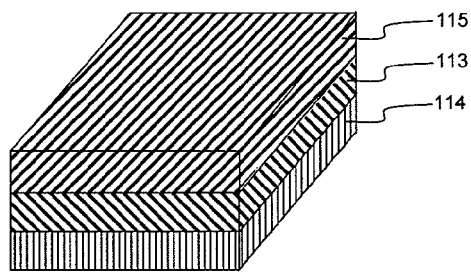
FIGS. 21A to 21H are explanatory views of another method for manufacturing the magnetic recording medium of the present invention.
Figure 21B:
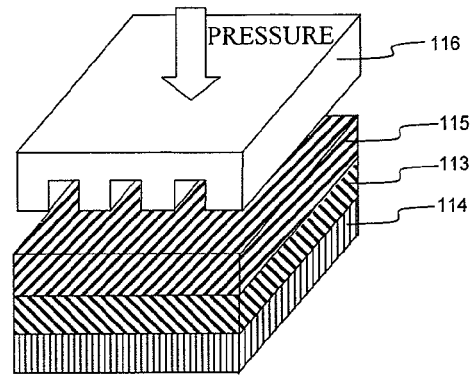
Figure 21C:
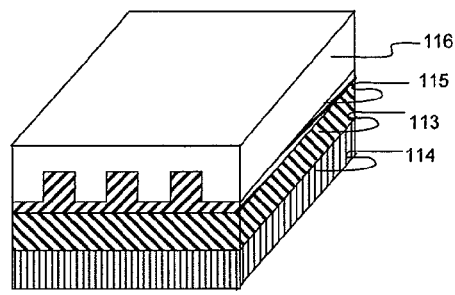
Figure 21D:
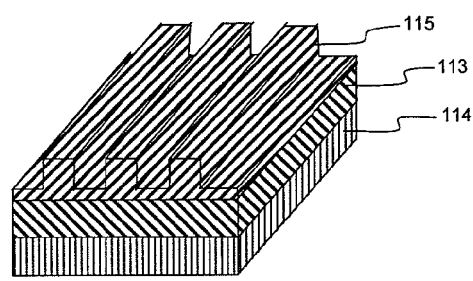
Figure 21E:
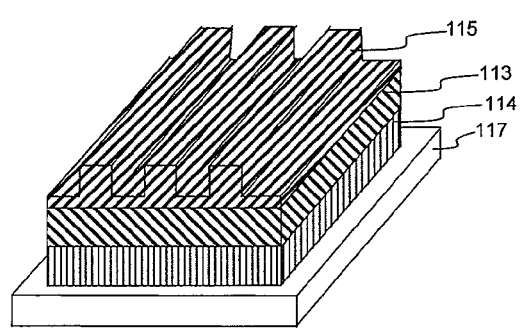
Figure 21F:
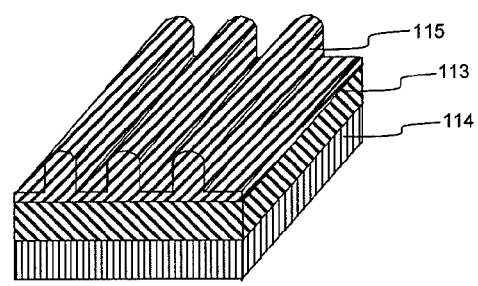
Figure 21G:
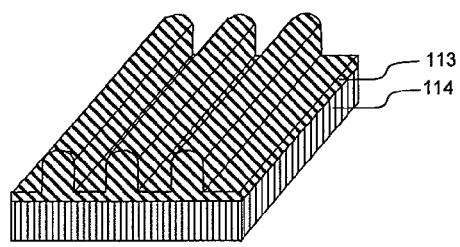
Figure 21H:
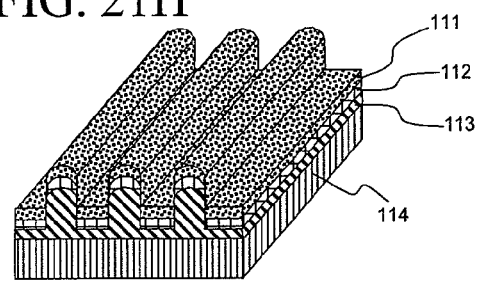
Figure 22A:
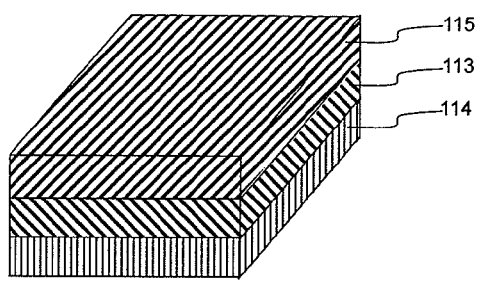
FIGS. 22A to 22F are explanatory views of another method for manufacturing the magnetic recording medium of the present invention.
Figure 22B:
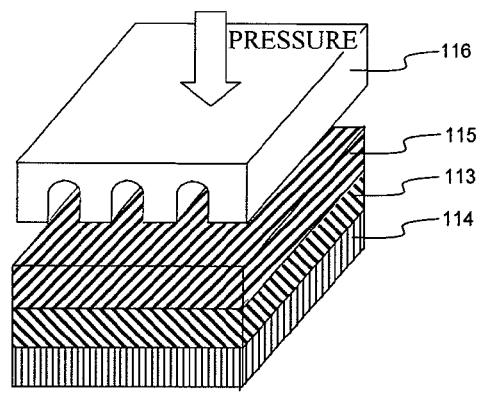
Figure 22C:
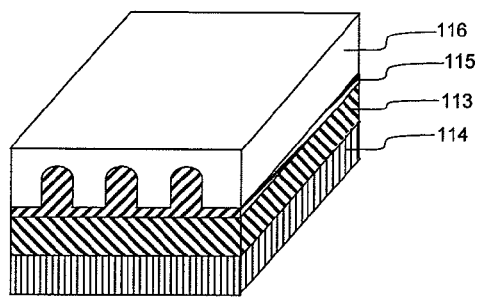
Figure 22D:
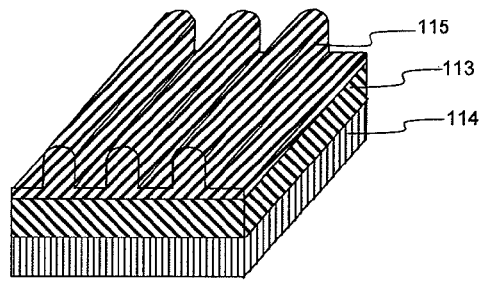
Figure 22E:
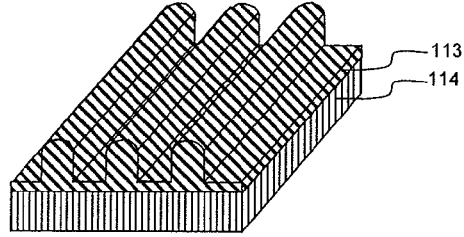
Figure 22F:
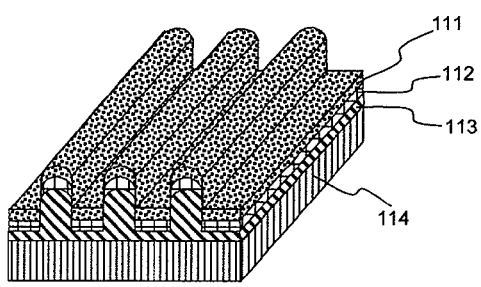
Figure 23A:
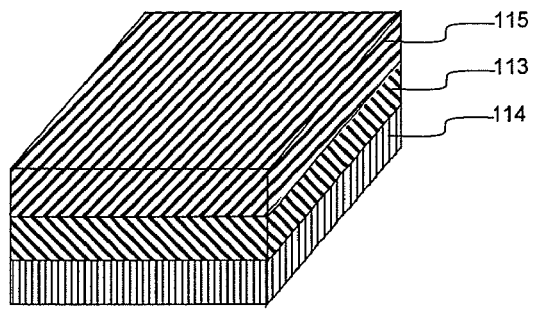
FIGS. 23A to 23E are explanatory views of a method for manufacturing a mold of the magnetic recording medium of the present invention.
Figure 23B:
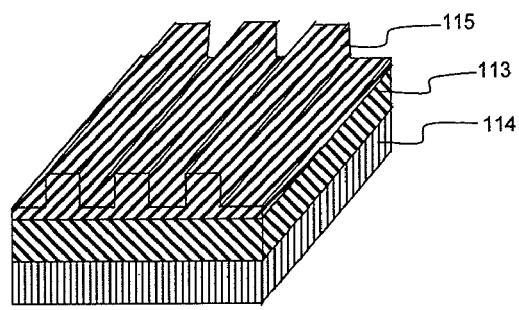
Figure 23C:
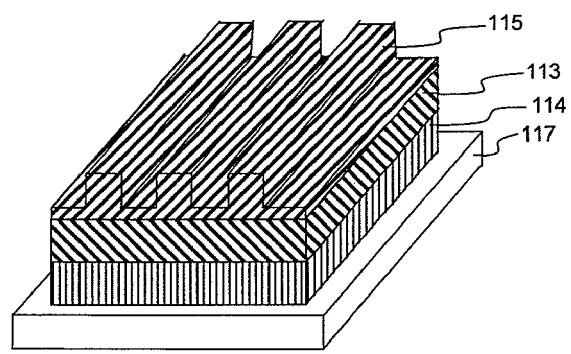
Figure 23D:
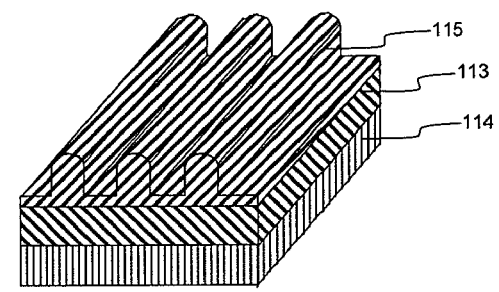
Figure 23E:
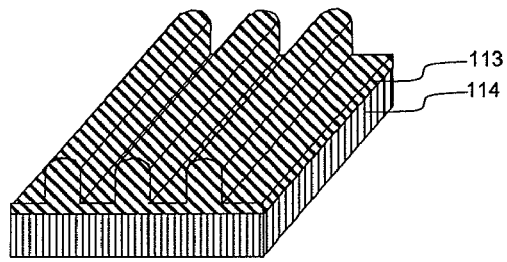
Figure 24A:
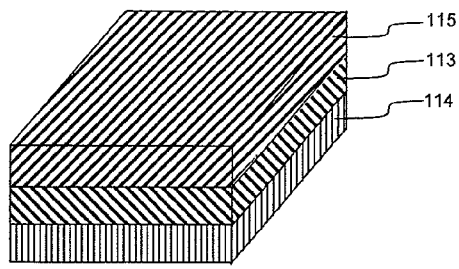
FIGS. 24A to 24I are explanatory views of a method for manufacturing the magnetic recording medium of the present invention.
Figure 24B:
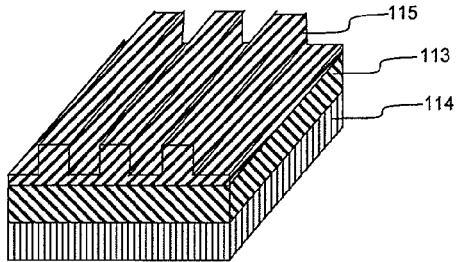
Figure 24C:
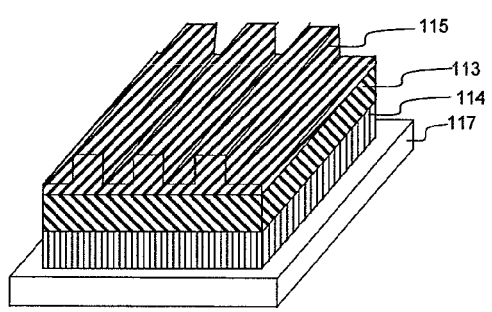
Figure 24D:
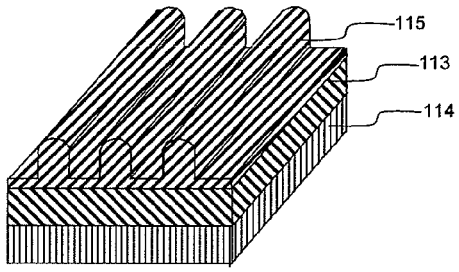
Figure 24E:
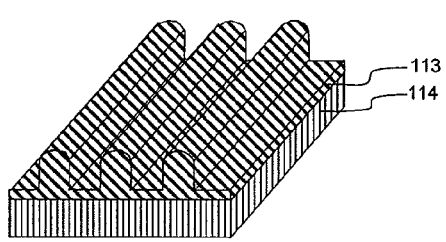
Figure 24F:
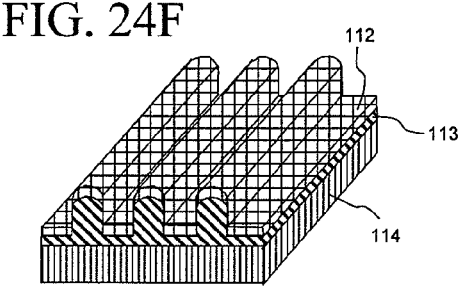
Figure 24G:
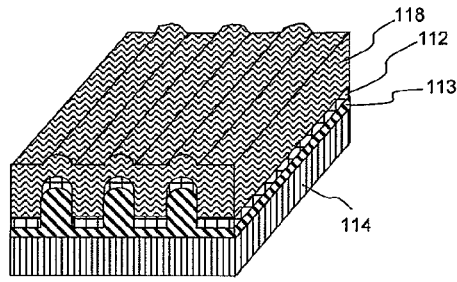
Figure 24H:
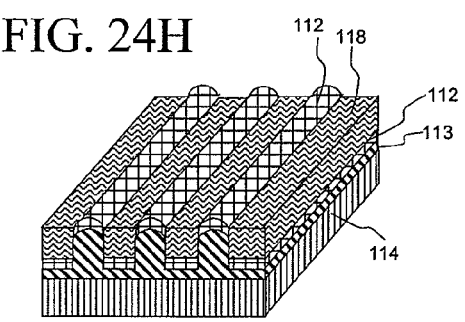
Figure 24I:
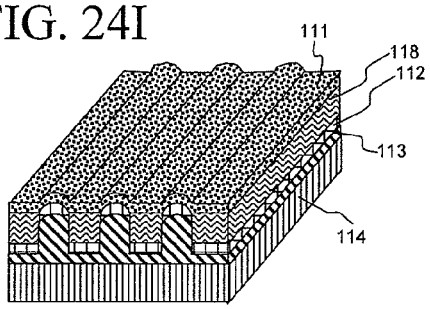

(a) When the non-magnetic substrate 114 having the resist 115 formed thereon is placed on the hot plate 117 as shown in FIG. 19C, a ring-like hot plate 117 that can transmit heat to an outer peripheral portion C of the medium is used to form cylindrical shelly or spherical shelly lands or grooves specific to the outer peripheral portion C.

(b) Similarly, a ring-like hot plate 117 that can transmit heat to a middle peripheral portion B of the medium is used to form cylindrical shelly or spherical shelly lands or grooves specific to the middle peripheral portion B of the medium.

(c) Similarly, a ring-like hot plate 117 that can transmit heat to an inner peripheral portion A of the medium is used to form cylindrical shelly or spherical shelly lands or grooves specific to the inner peripheral portion A of the medium. As described above, a heating temperature and a heating time can be changed with respect to radial positions on the medium. Thus, it is possible to form lands or grooves varying in shape, such as a cylindrical shape or a spherical shape, with respect to the radial positions on the medium.

Here, the method for manufacturing the discrete track medium has been described above. However, the patterned medium of the present invention having the curved magnetic layer can also be manufactured by use of the same method.

Figure 26:
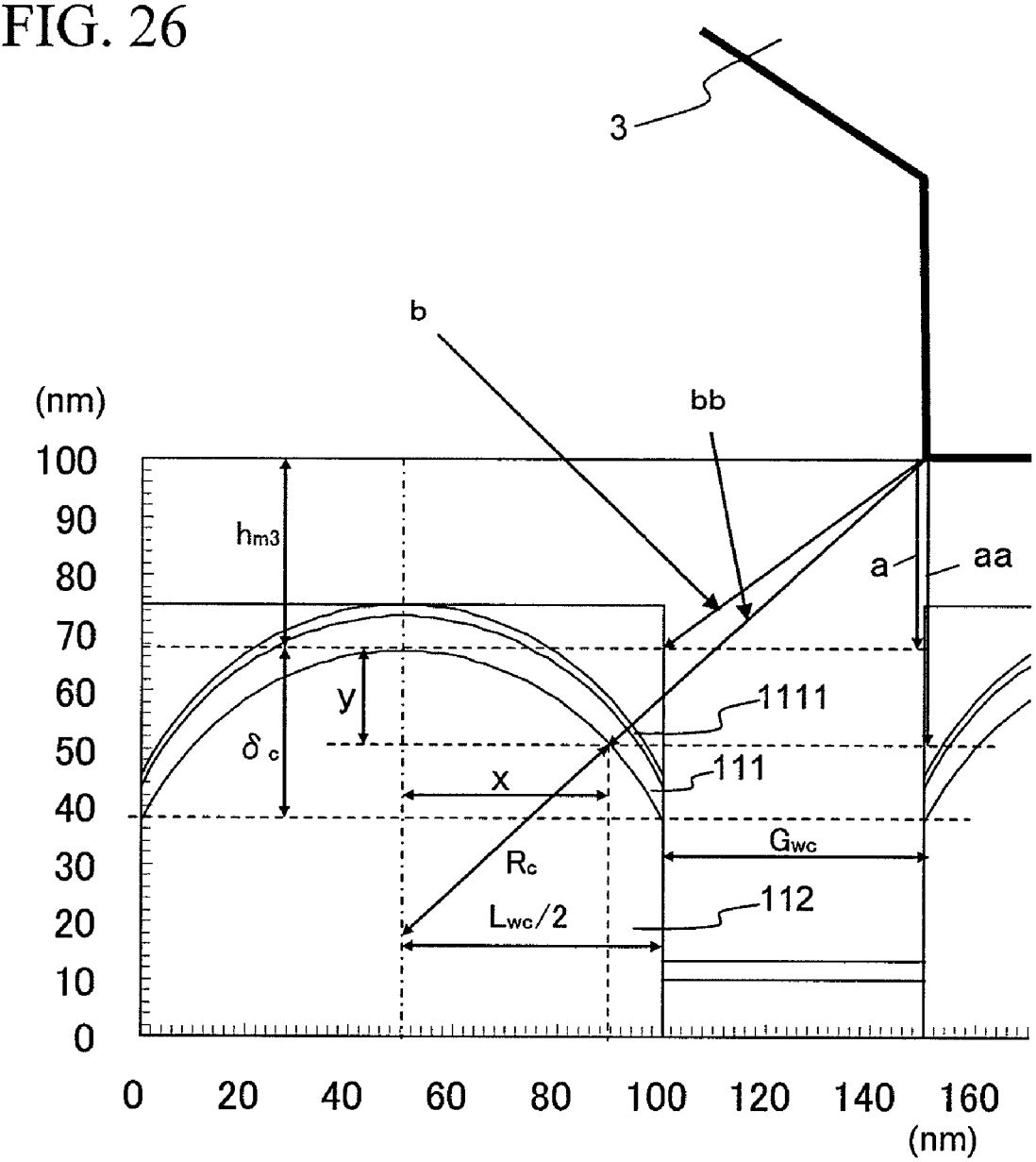
FIG. 26 is an explanatory view of a range of use of the magnetic recording media according to Embodiments 4 and 5 of the present invention.

With reference to FIG. 26, description will be given of a range of the height δc of cylindrical shelly land of the discrete track medium according to Embodiments 4 and 5 of the present invention. The medium according to Embodiments 4 and 5 of the present invention is a magnetic recording medium in which a magnetic layer provided in the lands has a curved upper surface that is convex in a medium surface direction and a flat lower surface.

As shown in FIG. 26, in the case of recording on the discrete track medium by using the writer 3 to apply a magnetic field thereto, conditions expressed by the following formulas (5) to (12) are required to make magnetic fluxes less likely to be leaked to adjacent tracks in the discrete track medium according to Embodiments 4 and 5 of the present invention as compared with the conventional discrete track medium. Accordingly, the range of the height δc of cylindrical shelly land takes a value that satisfies the formulas (5) to (12). Specifically, required is a condition that a difference (bb−aa) between a distance bb from the magnetic layer of the adjacent track in the discrete track medium of the present invention to the writer and a distance aa from the magnetic layer to the writer is larger than a difference (b−a) between a distance b from the magnetic layer of the adjacent track in the conventional discrete track medium to the writer and a distance a from the magnetic layer to the writer.

$$bb - aa > b - a \quad (5)$$

$$bb = \sqrt{\left(\frac{L_{wc}}{2} - x + G_{wc}\right)^2 + (h_{m3} + y)^2} \quad (6)$$

$$aa = h_{m3} + y \quad (7)$$

$$b = \sqrt{G_{wc}^2 + h_{m3}^2} \quad (8)$$

$$a = h_{m3} \quad (9)$$

$$h_{m3} = h_f + t_c + t_L \quad (10)$$

$$y = \delta_c \left(\frac{2}{L_w}\right)^2 x^2 \quad (11)$$

$$\delta_c = R_c - \sqrt{R_c^2 - \left(\frac{L_{wc}}{2}\right)^2} \quad (12)$$

Here, (x, y) is a position of the magnetic layer of the adjacent track in the discrete track medium of the present invention, and $t_L$ is a thickness of the lubricant 1111.

For example, in the case where Lwc=100 nm, Gwc=Lwc/2=50 nm, Rc=57 nm, tc=5 nm, $t_L$=2 nm, hf=25 nm, hm3=32 nm, x=40 nm, y=18.96 nm, and δc=29.63 nm, bb−aa=27.8 nm and b−a=27.36 nm are established and thus the formula (5) is satisfied. Accordingly, it is found out that, when the height δc of cylindrical shelly land in the discrete track medium according to Embodiments 4 and 5 of the present invention is 29.63 nm, the magnetic fluxes are less likely to be leaked to the adjacent tracks as compared with the conventional discrete track medium.

Figure 27A:
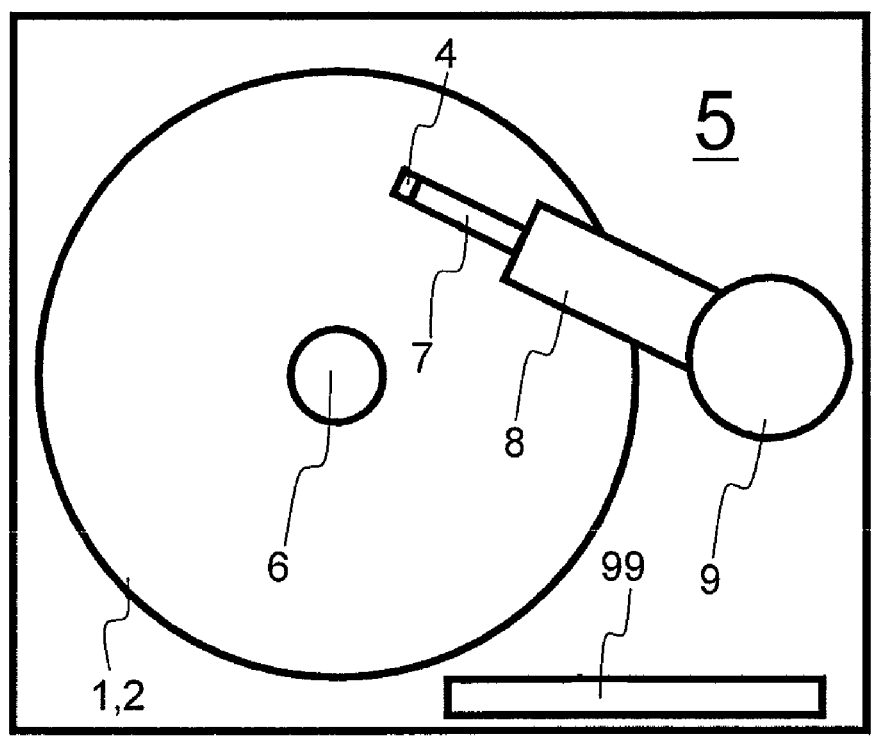
FIGS. 27A and 27B are schematic views of a magnetic disk apparatus.
Figure 27B:
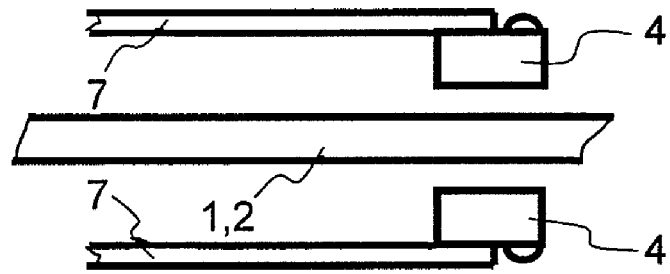

FIGS. 27A and 27B show an embodiment of a magnetic disk apparatus according to the present invention. FIG. 27A is a schematic plan view and FIG. 27B is a schematic side view showing a state where a magnetic head slider 4 performs scan and seek operations while flying above the surface of the magnetic recording medium 1 or 2. A magnetic disk apparatus 5 includes the magnetic recording medium 1 or 2 according to Embodiment 1 or 2 of the present invention, a drive member 6 which rotates the medium, the magnetic head slider 4, a support 7 of the magnetic head slider 4, a supporting arm 8 for positioning, a drive member 9 for the supporting arm, and a circuit 99 for processing a recording and reproducing signal of a magnetic head mounted on the magnetic head slider 4.

What is claimed is:

1. A magnetic recording medium comprising:
   lands which have a magnetic layer and form recording tracks; and
   grooves formed between the lands adjacent to each other,
      wherein an upper surface of the magnetic layer provided in the lands has a curved shape that is convex in a medium surface direction,
      wherein upper and lower surfaces of the magnetic layer when viewed from a track width direction have a curved shape that is convex upward.

2. The magnetic recording medium according to claim 1, wherein a thickness of the magnetic layer provided in the lands is approximately uniform in a track width direction.

3. The magnetic recording medium according to claim 1, wherein the land height is higher in inner and outer peripheral regions than in a region sandwiched between the inner and outer peripheral regions.

4. The magnetic recording medium according to claim 1, wherein the grooves are filled with a non-magnetic material.

5. The magnetic recording medium according to claim 1, wherein a lower surface of the magnetic layer has a curved shape that is convex in the medium surface direction.

6. A magnetic recording medium comprising a plurality of bit patterns which have a magnetic layer and are arranged in isolation from their surrounding along a crosstrack direction,
      wherein an upper surface of the magnetic layer provided in the bit patterns has a curved shape that is convex in a medium surface direction,
      wherein the magnetic layer provided in the bit patterns has a spherical shelly shape.

7. The magnetic recording medium according to claim 6, wherein a thickness of the magnetic layer provided in the bit patterns is approximately uniform in the crosstrack direction and in a track width direction.

8. The magnetic recording medium according to claim 6, wherein the land height is higher in inner and outer peripheral regions than in a region sandwiched between the inner and outer peripheral regions.

9. The magnetic recording medium according to claim 6, wherein a non-magnetic material is provided between the plurality of bit patterns arranged in isolation.

10. The magnetic recording medium according to claim 6, wherein a lower surface of the magnetic layer has a curved shape that is convex in the medium surface direction.

11. A magnetic recording and reproducing apparatus comprising:
   a magnetic recording medium;
   a medium drive member which drives the magnetic recording medium;
   a magnetic head which performs recording and reproduction operations on the magnetic recording medium; and a magnetic head drive member which positions the magnetic head with respect to the magnetic recording medium, wherein the magnetic recording medium includes lands which have a magnetic layer and form recording tracks, and grooves formed between the lands adjacent to each other, and an upper surface of the magnetic layer provided in the lands has a curved shape that is convex in a medium surface direction, upper and lower surfaces of the magnetic layer when viewed from a track width direction have a curved shape that is convex upward.

12. The magnetic recording and reproducing apparatus according to claim 11, wherein a thickness of the magnetic layer provided in the lands is approximately uniform in a track width direction.

* * * * *